(12) United States Patent
Ashtekar et al.

(10) Patent No.: US 9,779,891 B1
(45) Date of Patent: Oct. 3, 2017

(54) BREAKER MOTORIZED SECONDARY CONNECTOR - FIELD INSTALLABLE KIT

(71) Applicant: Eaton Corporation, Cleveland, OH (US)

(72) Inventors: Koustubh Ashtekar, Coraopolis, PA (US); Daniel Evan Palmieri, Coraopolis, PA (US); James Jeffrey Benke, Pittsburgh, PA (US); Brad Robert Leccia, Coraopolis, PA (US); Ronald Dale Hartzel, Butler, PA (US); Douglas Michael Brandt, Wampum, PA (US); David Andrew Schreiber, Pittsburgh, PA (US); Hongbin Wang, Novi, MI (US); Cory Robert Weeks, Atlanta, GA (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 15/089,650

(22) Filed: Apr. 4, 2016

(51) Int. Cl.
*H01H 9/22* (2006.01)
*H01H 71/02* (2006.01)

(52) U.S. Cl.
CPC .............. *H01H 9/22* (2013.01); *H01H 71/02* (2013.01)

(58) Field of Classification Search
CPC .................................. H01H 9/22; H01H 71/02
USPC .......................................................... 361/608
See application file for complete search history.

(56) References Cited

U.S. PATENT DOCUMENTS

| 8,553,394 B2* | 10/2013 | Hawkins | H02B 11/127 200/50.24 |
| 2002/0101704 A1* | 8/2002 | Leccia | H02B 11/133 361/605 |

* cited by examiner

Primary Examiner — Edwin A. Leon
Assistant Examiner — Iman Malakooti
(74) Attorney, Agent, or Firm — Eckert Seamans; David Jenkins; Grant Coffield

(57) ABSTRACT

A circuit breaker installation including a frame assembly and a circuit breaker assembly is provided. The frame assembly includes a conductor assembly and the frame assembly defines an enclosed space. The frame assembly conductor assembly includes a primary contact assembly and a movable secondary contact assembly. The circuit breaker assembly is movably disposed in the frame assembly enclosed space. The contact assemblies are configurable electrical components. The configurable electrical components move between a connect configuration, a test configuration, and, a disconnect configuration.

25 Claims, 20 Drawing Sheets

BREAKER MOTORIZED SECONDARY CONNECTOR - FIELD INSTALLABLE KIT

BACKGROUND OF THE INVENTION

Field of the Invention

The disclosed and claimed concept relates to a circuit breaker installation and, more specifically, to a circuit breaker installation including a circuit breaker assembly having a primary contact assembly and a secondary contact assembly, and a frame assembly having a primary contact assembly and a secondary contact assembly wherein the secondary contact assemblies move between a connect, test, and disconnect configuration.

Background Information

A circuit breaker installation includes a frame assembly, or housing assembly, that defines an enclosed space. The frame assembly also includes a contact assembly with a primary contact assembly and a secondary contact assembly. The frame assembly primary contact assembly is in electrical communication with a line and a load, as is known. A circuit breaker installation also includes a circuit breaker assembly which also has a contact assembly with a primary contact assembly and a secondary contact assembly. In use, the circuit breaker assembly is disposed in the frame assembly enclosed space with the circuit breaker assembly primary contact assembly in electrical communication with the frame assembly primary contact assembly. The circuit breaker assembly, in an exemplary embodiment, is moved from the frame assembly enclosed space; in this configuration, the circuit breaker assembly primary contact assembly is not in electrical communication with the frame assembly primary contact assembly.

The circuit breaker installation also includes additional assemblies such as, but not limited to, testing and monitoring devices. Testing and monitoring devices include, but are not limited to, input and output devices, sensors and actuators. The input and output devices are located outside the frame assembly and, in an exemplary embodiment, are electronically coupled to other, remote input and output devices. The sensors and actuators, as well as other devices, are located inside the frame assembly as well as inside the circuit breaker assembly. The input and output devices are coupled to, and in electronic communication with, the sensors and actuators via the frame assembly secondary contact assembly and the circuit breaker secondary contact assembly. That is, the circuit breaker secondary contact assembly is in electromechanical communication between control signals, various sensors, actuators and other devices within the frame assembly and the circuit breaker assembly. The frame assembly secondary contact assembly is a system to allow the input and output devices to communicate. When the frame assembly secondary contact assembly and the circuit breaker secondary contact assembly are coupled this allows for there to be electromechanical communication. Input is provided to the actuators and data from the sensors is provided to the output devices.

The additional control and monitoring devices are, in an exemplary embodiment, used when the circuit breaker assembly is not in service. Thus, the frame assembly secondary contact assembly and the circuit breaker secondary contact assembly are structured to be in contact with each other even after the circuit breaker assembly primary contact assembly and the frame assembly primary contact assembly are separated. That is, the frame assembly primary contact assembly is disposed at the rear of the frame assembly enclosed space. The circuit breaker assembly primary contact assembly is disposed on the rear side of the circuit breaker assembly. The frame assembly secondary contact assembly and the circuit breaker secondary contact assembly were arranged in a similar manner, i.e., with the frame assembly secondary contact assembly facing (exposed to) the front side of the frame assembly enclosed space, and the circuit breaker secondary contact assembly facing the rear side of the frame assembly enclosed space. The frame assembly secondary contact assembly and the circuit breaker secondary contact assembly were, however, movable along with the circuit breaker assembly.

In this configuration, and when the circuit breaker assembly was disposed substantially within the frame assembly enclosed space, the circuit breaker assembly primary contact assembly is in electrical communication with the frame assembly primary contact assembly. When the circuit breaker assembly was removed from the frame assembly enclosed space, the circuit breaker assembly primary contact assembly separated from, and was no longer in electrical communication with, the frame assembly primary contact assembly. Because the frame assembly secondary contact assembly and the circuit breaker secondary contact assembly moved along with the circuit breaker assembly, the secondary contact assemblies remained in electronic communication while the circuit breaker assembly moved. When the circuit breaker assembly was substantially removed from the frame assembly enclosed space, the frame assembly secondary contact assembly and the circuit breaker secondary contact assembly also separated. Thus, the circuit breaker assembly was to have three configurations: (1) a "connect" configuration, wherein the circuit breaker assembly primary contact assembly is coupled to, and in electrical communication with, the frame assembly primary contact assembly and the circuit breaker assembly secondary contact assembly is coupled to, and in electrical communication with, the frame assembly secondary contact assembly, (2) a "test" configuration, wherein the circuit breaker assembly primary contact assembly is not coupled to, and is not in electrical communication with, the frame assembly secondary contacts and the circuit breaker assembly secondary contacts are coupled to, and in electrical communication with, the frame assembly secondary contact assembly, and, (3) a "disconnect" configuration, wherein the circuit breaker assembly primary contact assembly is not coupled to, and is not in electrical communication with, the frame assembly primary contact assembly, and, the circuit breaker assembly secondary contact assembly is not coupled to, and is not in electrical communication with, the frame assembly secondary contact assembly. Further, there is an "isolation" configuration wherein the circuit breaker assembly is completely removed from the frame assembly.

The disadvantage to this configuration is that an arc may form when the circuit breaker assembly primary contact assembly is separated from the frame assembly primary contact assembly, and/or when the circuit breaker assembly primary contact assembly is near to the frame assembly primary contact assembly. Because the known circuit breaker assemblies move through the configurations in this order connect to test, test to disconnect, during removal (and in the opposite order during installation), the circuit breaker assembly primary contact assembly and the frame assembly primary contact assembly are close enough to each other to generate an arc when in the "test" configuration.

There is, therefore, a need for a circuit breaker installation that avoids this disadvantage. There is a further need for an added assembly that overcomes this disadvantage in preexisting circuit breaker installations.

SUMMARY OF THE INVENTION

These needs, and others, are met by at least one embodiment of the disclosed and claimed concept which provides a frame assembly secondary contact assembly including a case assembly, a number of secondary contacts, the number of secondary contacts disposed in the case assembly, a slider assembly, the slider assembly structured to be coupled to the circuit breaker assembly, and a carriage assembly. The case assembly is fixed to the slider assembly. The carriage assembly is structured to be coupled to the frame assembly. The case assembly moves between an inserted, first position, a medial position, and a second position. The case assembly moves between a connect configuration, wherein the circuit breaker assembly primary contacts are coupled to, and in electrical communication with, the frame assembly primary contacts and the circuit breaker assembly secondary contacts are coupled to, and in electrical communication with, the frame assembly secondary contacts, a test configuration, wherein the circuit breaker assembly primary contacts are not coupled to, and are not in electrical communication with, the frame assembly secondary contacts and the circuit breaker assembly secondary contacts are coupled to, and in electrical communication with, the frame assembly secondary contacts, and, a disconnect configuration, wherein the circuit breaker assembly primary contacts are not coupled to, and are not in electrical communication with, the frame assembly primary contacts, and, the circuit breaker assembly secondary contacts are not coupled to, and are not in electrical communication with, the frame assembly secondary contacts. When the case assembly is moved into the test configuration, the circuit breaker assembly remains in the second position, and, the case assembly moves from one of the first position or the second position to the medial position.

In another embodiment, the disclosed and claimed concept provides a circuit breaker installation including a frame assembly and a circuit breaker assembly. The frame assembly includes a conductor assembly and the frame assembly defines an enclosed space. The frame assembly enclosed space includes a front side and a rear side. The frame assembly conductor assembly includes a primary contact assembly and a movable secondary contact assembly. The frame assembly primary contact assembly includes a number of primary contacts. The frame assembly secondary contact assembly includes a number of secondary contacts. The circuit breaker assembly includes a housing assembly and conductor assembly. The circuit breaker assembly conductor assembly includes a number of primary contacts and a number of secondary contacts. The frame assembly conductor assembly and the circuit breaker assembly conductor assembly are configurable electrical components. The circuit breaker assembly is movably disposed in the frame assembly enclosed space. The circuit breaker assembly moves between an inserted, first position and a withdrawn, second position. The frame assembly secondary contact assembly moves between an inserted, first position, a medial position, and a second position. The configurable electrical components move between a connect configuration, wherein the circuit breaker assembly primary contacts are coupled to, and in electrical communication with, the frame assembly primary contacts and the circuit breaker assembly secondary contacts are coupled to, and in electrical communication with, the frame assembly secondary contacts, a test configuration, wherein the circuit breaker assembly primary contacts are not coupled to, and are not in electrical communication with, the frame assembly secondary contacts and the circuit breaker assembly secondary contacts are coupled to, and in electrical communication with, the frame assembly secondary contacts, and, a disconnect configuration, wherein the circuit breaker assembly primary contacts are not coupled to, and are not in electrical communication with, the frame assembly primary contacts, and, the circuit breaker assembly secondary contacts are not coupled to, and are not in electrical communication with, the frame assembly secondary contacts. When the configurable electrical components are moved into the test configuration, the circuit breaker assembly remains in the second position, and, the frame assembly secondary contact assembly moves from one of the first position or the second position to the medial position.

The configuration and positioning of the elements and assemblies described below solve the stated problems. That is, for example, the position of the secondary contact assembly is closer to the front of the frame assembly enclosed space when in the test configuration and closer to the rear of the frame assembly enclosed space when in the disconnect configuration solve the stated problems.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
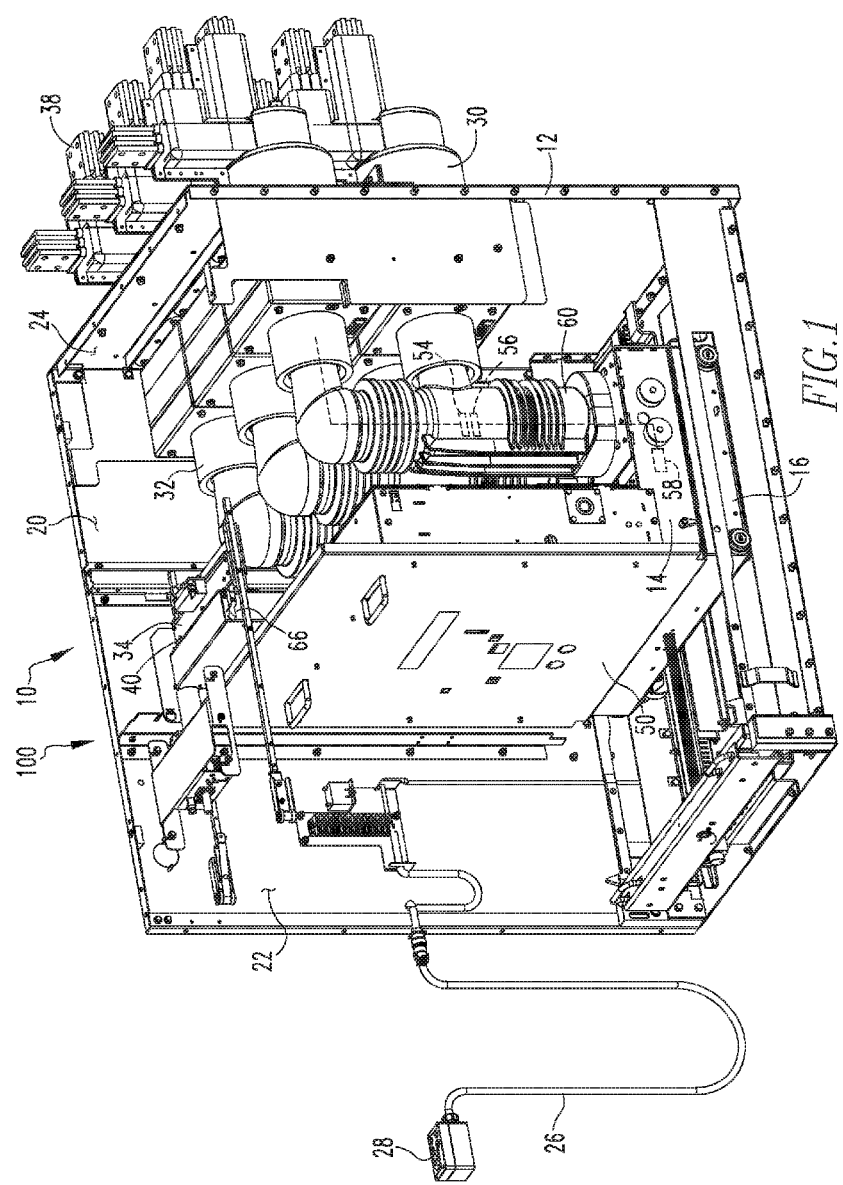
FIG. 1 is an isometric view of a circuit breaker installation with configurable electrical components in a connect configuration.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. It is noted that moving parts, such as but not limited to circuit breaker contacts, are "directly coupled" when in one position, e.g., the closed, second position, but are not "directly coupled" when in the open, first position. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof.

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut.

As used herein, a "removable coupling assembly" means a coupling that is structured to be separated with minimal effort. As a non-limiting example, a threaded coupling is structured to be separated by rotating the elements relative to each other. A coupling such as a weld, although separable with effort, is not a "removable coupling assembly." Similarly, to be "removably coupled" means to be coupled by a "removable coupling assembly." That is, when a number of elements are "removably coupled" it means that the elements can be separated with minimal effort such as, but not limited to, decoupling a threaded coupling.

As used herein, a "removable component" is an element or assembly that is coupled to other elements by a "removable coupling assembly." For example, a threaded element that is threadably coupled to another element is a "removable component." As used herein, being a "removable component" is an inherent feature of any element or assembly that is coupled to other elements by a "removable coupling assembly."

As used herein, "correspond" indicates that two structural components are sized and shaped to be similar to each other and are structured to be coupled with a minimum amount of friction. Thus, an opening which "corresponds" to a member is sized slightly larger than the member so that the member is structured to pass through the opening with a minimum amount of friction. This definition is modified if the two components are said to fit "snugly" together or "snuggly correspond." In that situation, the difference between the size of the components is even smaller whereby the amount of friction increases. If the element defining the opening and/or the component inserted into the opening is made from a deformable or compressible material, the opening in an exemplary embodiment, is slightly smaller than the component being inserted into the opening. This definition is further modified if the two components are said to "substantially correspond." "Substantially correspond" means that the size of the opening is very close to the size of the element inserted therein; that is, not so close as to cause substantial friction, as with a snug fit, but with more contact and friction than a "corresponding fit," i.e., a "slightly larger" fit.

As used herein, the statement that two or more parts or components "engage" one another shall mean that the elements exert a force or bias against one another either directly or through one or more intermediate elements or components. Further, as used herein with regard to moving parts, a moving part "engages" another element during the motion from one position to another and/or "engages" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A either engages element B while in element A first position.

As used herein, "operatively engage" means "engage and move." That is, "operatively engage" when used in relation to a first component that is structured to move a movable or rotatable second component means that the first component applies a force sufficient to cause the second component to move. For example, a screwdriver is structured to be placed into contact with a screw. When no force is applied to the screwdriver, the screwdriver is merely "coupled" to the screw. If an axial force is applied to the screwdriver, the screwdriver is pressed against the screw and "engages" the screw. However, when a rotational force is applied to the screwdriver, the screwdriver "operatively engages" the screw and causes the screw to rotate.

As used herein, the word "unitary" means a component that is created as a single piece or unit. That is, a component that includes pieces that are created separately and then coupled together as a unit is not a "unitary" component or body.

As used herein, the term "number" shall mean one or an integer greater than one (i.e., a plurality).

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, and in the phrase "[x] moves between a first position and a second position corresponding to [y] first and second positions," wherein "[x]" and "[y]" are elements or assemblies, the word "correspond" means that when element [x] is in the first position, element [y] is in the first position, and, when element [x] is in the second position, element [y] is in the second position. It is noted that "correspond" relates to the final positions and does not mean the elements must move at the same rate or simultaneously. That is, for example, a hubcap and the wheel to which it is attached rotate in a corresponding manner. Conversely, a spring biased latched member and a latch release move at different rates. That is, as an example, a latch release moves between a first position, wherein the latched member is not released, and a second position, wherein the latched member is released. The spring-biased latched member moves between a first latched position and a second released position. The latch release, in this example, is moved slowly between positions and, until the release is in the second position, the latched member remains in the first position. But, as soon as the latch release reaches the second position, the latched member is released and quickly moves to the second position. Thus, as stated above, "corresponding" positions mean that the elements are in the identified first positions at the same time, and, in the identified second positions at the same time.

As used herein, in the phrase "[x] moves between its first position and second position," or, "[y] is structured to move [x] between its first position and second position," "[x]" is the name of an element or assembly. Further, when [x] is an element or assembly that moves between a number of positions, the pronoun "its" means "[x]," i.e., the named element or assembly that precedes the pronoun "its."

As used herein, "in electronic communication" is used in reference to communicating a signal via an electromagnetic wave or signal. "In electronic communication" includes both hardline and wireless forms of communication; thus, for example, a "data transfer" or "communication method" via a component "in electronic communication" with another component means that data is transferred from one computer to another computer (or from one processing assembly to another processing assembly) by physical connections such as USB, Ethernet connections or remotely such as NFC, blue tooth etc. and should not be limited to any specific device.

As used herein, "in electric communication" means that a current passes, or can pass, between the identified elements. Being "in electric communication" is further dependent upon an element's position or configuration. For example, in a circuit breaker, a movable contact is "in electric communication" with the fixed contact when the contacts are in a closed position. The same movable contact is not "in electric communication" with the fixed contact when the contacts are in the open position.

As used herein, a "path of travel" or "path" includes the space an element moves through when in motion.

As used herein, an "added assembly" is an assembly or element that is not included with the initial installation of a circuit breaker assembly or frame assembly. That is, an "added assembly" is an assembly or element that is added onto, or retrofitted, into a circuit breaker assembly or frame assembly. It is noted that, as used herein, an assembly or element that is "capable" of being added onto, or retrofitted, into a circuit breaker assembly or frame assembly is not an "added assembly." That is, to establish an assembly or element as an "added assembly" it must be shown, or otherwise proven, that the assembly or element was not part of an original installation and has been added onto, or retrofitted, into a circuit breaker assembly or frame assembly.

As used herein, any indication of a "position" or a "configuration" relates to the element identified immediately before the reference to the "position" or "configuration." For example, in the phrase "moving the frame assembly secondary contact assembly 34 from one of the first position or the third position to the second position while the circuit breaker assembly 14 remains in the second position," the reference the "first position" and the initial reference to the "second position" relate to the "frame assembly secondary contact assembly 34" which is the element identified immediately before the reference to the "position" or "configuration." Further, the second reference to a "second position" relates to the "circuit breaker assembly 14" which is the element identified immediately before the reference to the "position" or "configuration."

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

Figure 2:
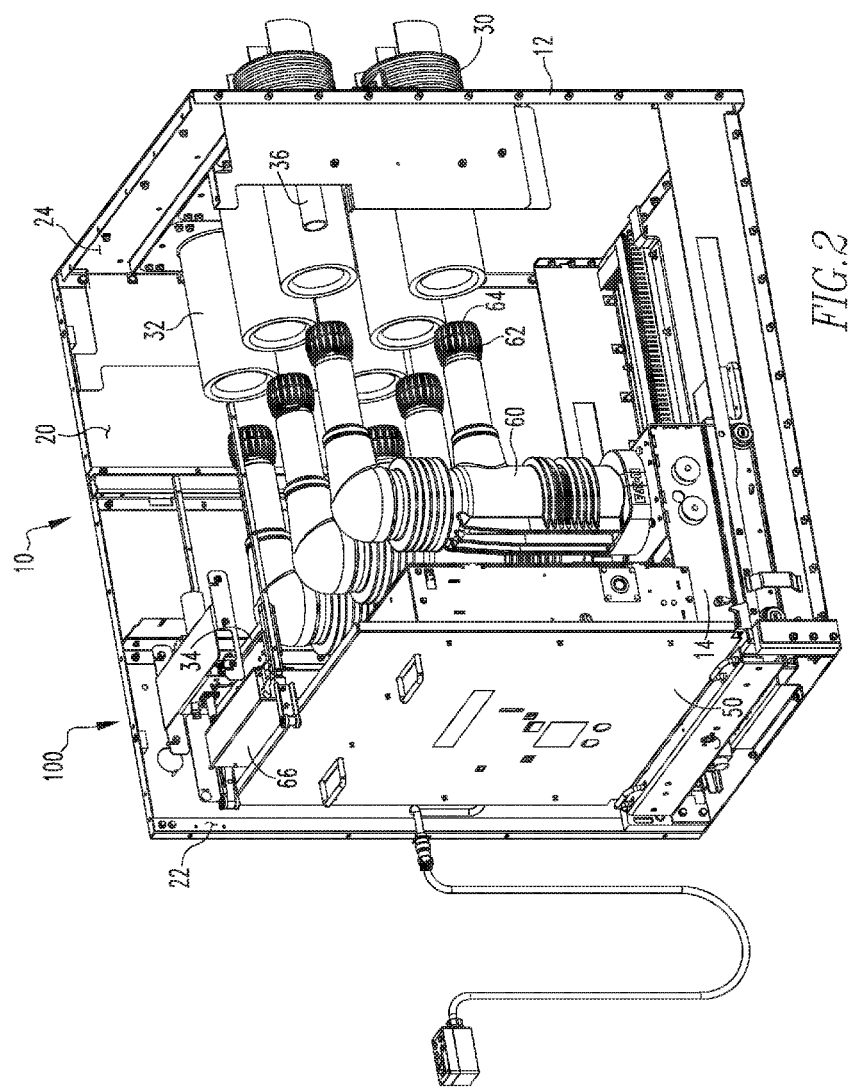
FIG. 2 is an isometric view of a circuit breaker installation with configurable electrical components in a test configuration.
Figure 3:
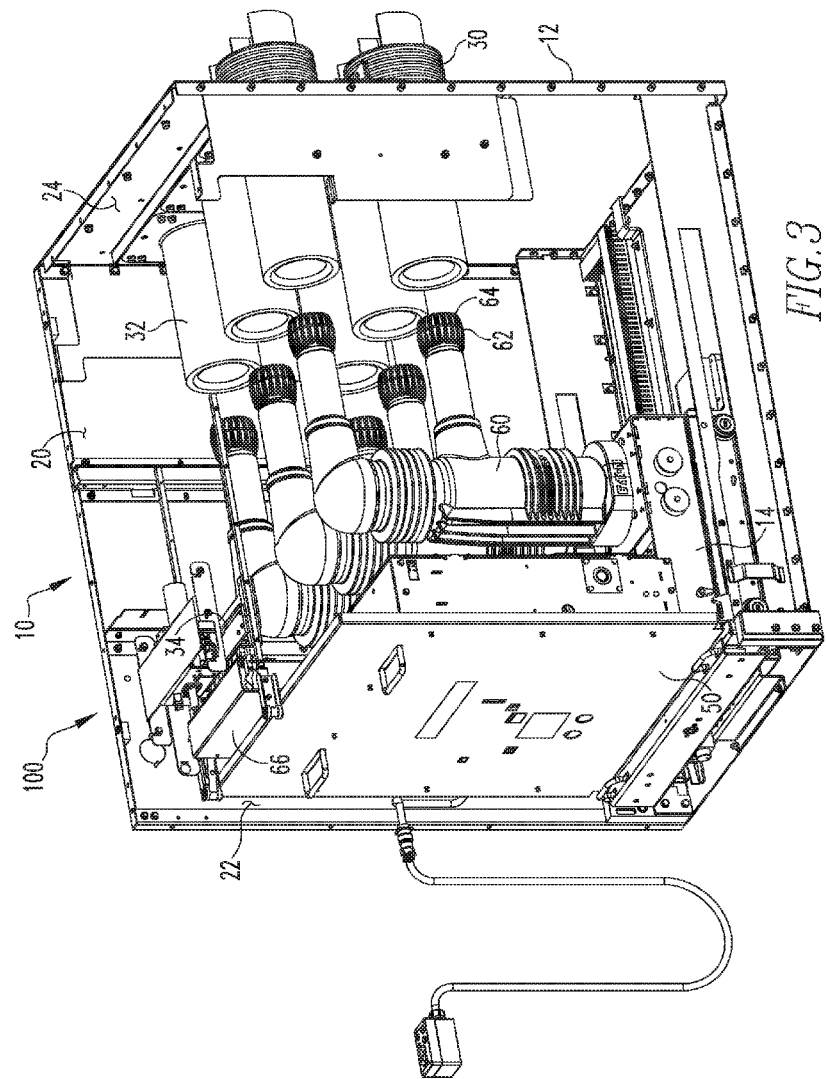
FIG. 3 is an isometric view of a circuit breaker installation with configurable electrical components in a disconnect configuration.

A circuit breaker installation 10 is shown in FIGS. 1-3. The circuit breaker installation 10 includes a frame assembly 12, a circuit breaker assembly 14, and a racking assembly 16. The frame assembly 12 defines an enclosed space 20. That is, the frame assembly 12 includes a number of elongated, rigid members (not numbered) and/or a number of sidewalls (not numbered) that define the frame assembly enclosed space 20. The frame assembly enclosed space 20 includes a front side 22 and a rear side 24. The frame assembly 12, in an exemplary embodiment, includes a door (not numbered) that is movably coupled to the frame assembly 12 at the frame assembly enclosed space front side 22. The door is movable between an open position, wherein the circuit breaker assembly 14 can be moved in and out of the frame assembly enclosed space 20, and a closed position, wherein the circuit breaker assembly 14 is substantially enclosed within the frame assembly enclosed space 20.

The frame assembly 12 also includes a conductor assembly 30. As is known, the frame assembly conductor assembly 30 includes conductive elements that are structured to be in electric, or electronic, communication with other conductive elements, as described below. The frame assembly conductor assembly 30, in an exemplary embodiment, includes a primary contact assembly 32 (hereinafter "frame assembly primary contact assembly" 32) and a movable secondary contact assembly 34 (hereinafter "frame assembly secondary contact assembly" 34). The frame assembly primary contact assembly 32 is, in an exemplary embodiment, disposed at the frame assembly enclosed space rear side 24. As is known, the frame assembly primary contact assembly 32 is in electrical communication with a line and a load, neither shown. The frame assembly primary contact assembly 32 includes a number of primary contacts 36 (which are also be identified as "stabs" 36) and external bus members 38. As used herein, an electrical "contact" is a terminal structured to be placed in a number of configurations including a configuration wherein the "contact" is in electrical communication with other conductive elements, and a configuration wherein the "contact" is not in electrical communication with other conductive elements. The frame assembly primary contact assembly number of primary contacts 36 (hereinafter "frame assembly primary contacts" 36) are, in an exemplary embodiment, structured to be in a "connect configuration" and a "disconnect configuration," as discussed below. The frame assembly primary contact assembly external bus members 38 are structured to be in electrical communication with a line and a load, neither shown.

Figure 9:
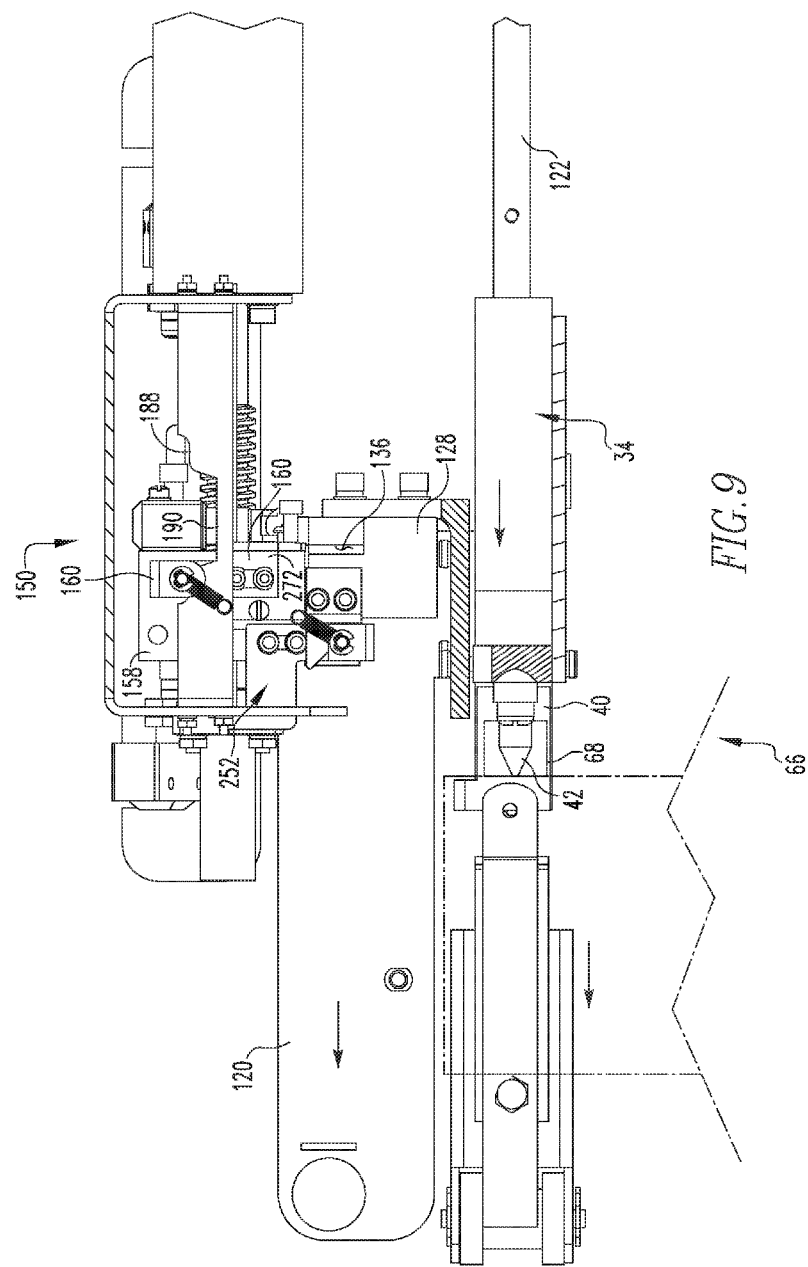
FIG. 9 is a side view of a slider assembly and carriage assembly in a test configuration.

The frame assembly secondary contact assembly 34, in an exemplary embodiment, includes a case assembly 40 and a number of secondary contacts 42 (FIG. 9). The frame assembly secondary contact assembly case assembly 40, (hereinafter "case assembly" 40) is a non-conductive enclosure structured to maintain the frame assembly secondary contact assembly secondary contacts 42 (hereinafter "frame assembly secondary contacts" 42) in a generally fixed relationship relative to each other. The case assembly 40, in an exemplary embodiment, is a common serial bus connector 41, or similar construct. The case assembly 40, i.e., the frame assembly secondary contact assembly 34, is movably coupled to the frame assembly frame members or sidewall members and, as discussed in detail below, is coupled, directly coupled, or fixed to a slider assembly 120. The case assembly 40, i.e., the frame assembly secondary contact assembly 34, is structured to, and does, move between a "connect, first position," a "test, second position," and a "disconnect, third position," as discussed below.

As is known, the frame assembly secondary contact assembly 34 (and the case assembly 40) is coupled to, and is in electrical and/or electronic communication with, a flexible conductor 26, such as, but not limited to wire(s), cable(s), or a ribbon cable. The flexible conductor 26 is further coupled to, and is in electrical and/or electronic communication with, the circuit breaker assembly 14, and the racking assembly 16. That is, the flexible conductor is further coupled to, and is in electrical and/or electronic communication with sensors and control devices (not shown) on the circuit breaker assembly 14. Similarly, the flexible conductor is further coupled to, and is in electrical and/or electronic communication with sensors and control devices on the racking assembly 16. The flexible conductor is further coupled to, and is in electrical and/or electronic communication with, a control and/or monitoring assembly 28 (hereinafter "control assembly" 28). As is known, the control assembly 28 is structured to actuate the racking assembly 16, and therefore structured to move, the circuit breaker assembly 14 as well as other configurable electrical components 100, discussed below. As used herein, the control assembly 28 and the flexible conductor 26 are associated with, and can be considered part of, any of the frame assembly 12, circuit breaker assembly 14, the frame assembly secondary contact assembly 34, slider assembly 120 and/or the carriage assembly 150, discussed below. The control assembly 28 is structured to control the configurable electrical components 100 in a manner similar to the remote control assembly 428, discussed below.

The circuit breaker assembly 14 includes a housing assembly 50 and conductor assembly 60. In an exemplary embodiment, the circuit breaker assembly housing assembly 50 encloses the conductor assembly 60, which includes a number of fixed contacts 54, a number of movable contacts 56, an operating mechanism 58 (elements shown schematically), and a trip unit (not shown) as is generally known. As is known, the operating mechanism 58 is structured to move the movable contacts 56 between an open, first position, wherein each movable contact 56 is not coupled to and is not in electrical communication with, an associated fixed contact 54, and a closed, second position, wherein each movable contact 56 is coupled to and is in electrical communication with, an associated fixed contact 54.

The circuit breaker assembly conductor assembly 60 further includes a primary contact assembly 62. The circuit breaker assembly conductor assembly primary contact assembly 62 (hereinafter "circuit breaker assembly primary contact assembly" 62) includes a number of primary contacts 64. The circuit breaker assembly primary contact assembly number of primary contacts 64 (commonly known as "finger cluster assembly," hereinafter "circuit breaker assembly primary contacts" 64) are coupled, directly coupled, or fixed to the circuit breaker assembly housing assembly 50. In an exemplary embodiment, the circuit breaker assembly primary contacts 64 are fixed to the circuit breaker assembly housing assembly 50 and move therewith.

Figure 5:
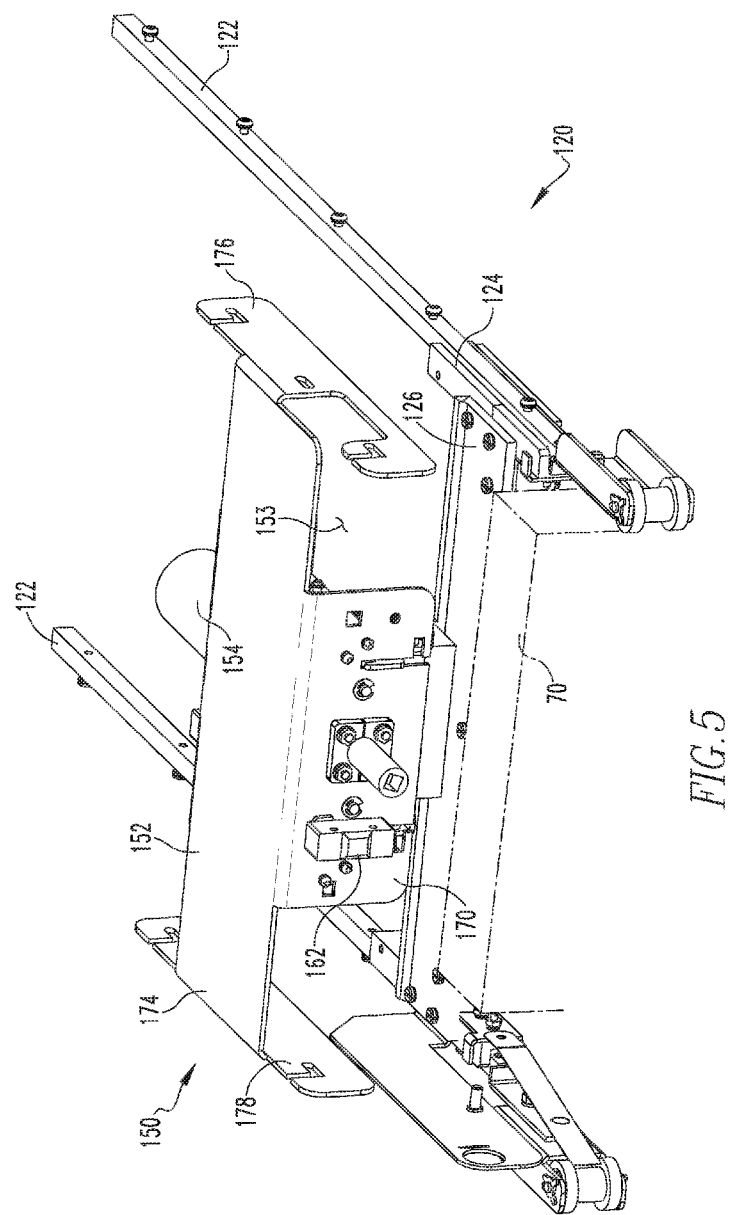
FIG. 5 is an isometric view of a slider assembly and carriage assembly in a test configuration.
Figure 6:
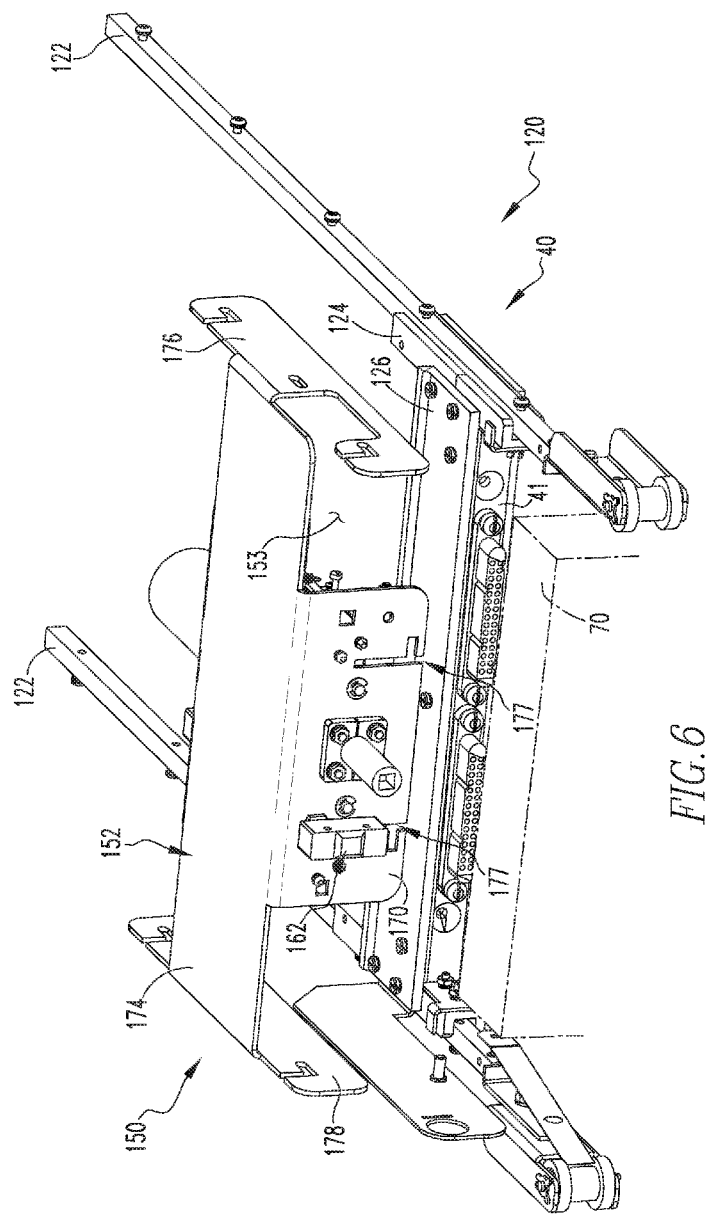
FIG. 6 is an isometric view of a slider assembly and carriage assembly in a disconnect configuration.

The circuit breaker assembly conductor assembly 60 also includes a secondary contact assembly 66. The circuit breaker assembly conductor assembly secondary contact assembly 66 (hereinafter "circuit breaker assembly secondary contact assembly" 66) includes a number of secondary contacts 68 (FIG. 9). The circuit breaker assembly secondary contact assembly number of primary contacts 68 (hereinafter "circuit breaker assembly secondary contacts" 68) are coupled, directly coupled, or fixed to the circuit breaker assembly housing assembly 50. In an exemplary embodiment, the circuit breaker assembly secondary contacts 68 are fixed to the circuit breaker assembly housing assembly 50 and move therewith. It is understood that, in an exemplary embodiment, the circuit breaker assembly secondary contact assembly 66 maintains the circuit breaker assembly secondary contacts 68 in a generally fixed relationship relative to each other. For example, the circuit breaker assembly secondary contact assembly 66 includes a rigid housing (not numbered) such as, but not limited to a common serial bus connector 70, or similar construct, as shown in FIGS. 5 and 6. It is understood that the frame assembly secondary contacts 42 and the circuit breaker assembly secondary contacts 68 are disposed in a corresponding pattern so that the frame assembly secondary contact assembly 34 and the circuit breaker assembly secondary contact assembly 66 can be moved into, or separated from, electrical and/or electronic communication with each other, as described below.

The following discussion shall address the various positions and "configurations" in which the circuit breaker assembly 14 and the number of contact assemblies 32, 34, 62, 66 are disposed. Initially, it is noted that the frame assembly conductor assembly 30 and the circuit breaker assembly conductor assembly 60 are, as used herein, "configurable electrical components" 100. That is, as used herein, "configurable electrical components" 100 are elements in which the identified "configuration" depends upon the position and status (in or not in electrical/electronic communication) of other elements. Thus, the "configuration" of an identified configurable electrical component is a characteristic of the configurable electrical component even if the "configuration" depends upon the position and status of other elements. Further, in the following discussion, it is assumed that the circuit breaker assembly 14 is in operation, i.e., in an inserted, first position within the frame assembly enclosed space 20, and is being removed and tested. Further, the conductor assembly movable contacts 56 are also "configurable electrical components" 100 which are movable between the open, first positions and closed, second positions discussed above.

That is, in an exemplary embodiment, the circuit breaker assembly 14 is movably disposed in the frame assembly enclosed space 20. That is, the racking assembly 16 is structured to move the circuit breaker assembly 14 between an inserted, first position and a withdrawn, second position. These positions are also identified as the "connect configuration" and "test configuration," respectively. Further, for the circuit breaker assembly 14 and the "test configuration" is the same position as the "disconnect configuration," as discussed below. In the first position, the circuit breaker assembly primary contact assembly 62, i.e., the circuit breaker assembly primary contacts 64, are coupled, or directly coupled, and are in electrical communication with, the frame assembly primary contact assembly 32, i.e., the frame assembly primary contacts 36. In the second position, the circuit breaker assembly primary contact assembly 62, i.e., the circuit breaker assembly primary contacts 64, are spaced from, and are not in electrical communication with, the frame assembly primary contact assembly 32, i.e., the frame assembly primary contacts 36. The circuit breaker assembly secondary contact assembly 66, i.e., the circuit breaker assembly secondary contacts 68, move with the circuit breaker assembly housing assembly 50 and therefore move between an inserted, first position and a withdrawn, second position. As before, these positions are also identified as the "connect configuration" and "test configuration," respectively, for the circuit breaker assembly secondary contacts 68. Further, for the circuit breaker assembly secondary contacts 68, the "test configuration" is the same position as the "disconnect configuration," as discussed below. The frame assembly primary contact assembly 32, in an exemplary embodiment, does not move. As noted above, the frame assembly secondary contact assembly 34 is movable between a "connect, first position," a "test, second position," and a "disconnect, third position" (also identified hereinafter as a frame assembly secondary contact assembly 34 "first position," "second position," and "third position"). As set forth below, the configurable electrical components 100 are each configurable in a "connect configuration," a "test configuration," and a "disconnect configuration" which is also identified as a "connect, first configuration," a "test, second configuration," and a "disconnect, third configuration," respectively.

Figure 4:
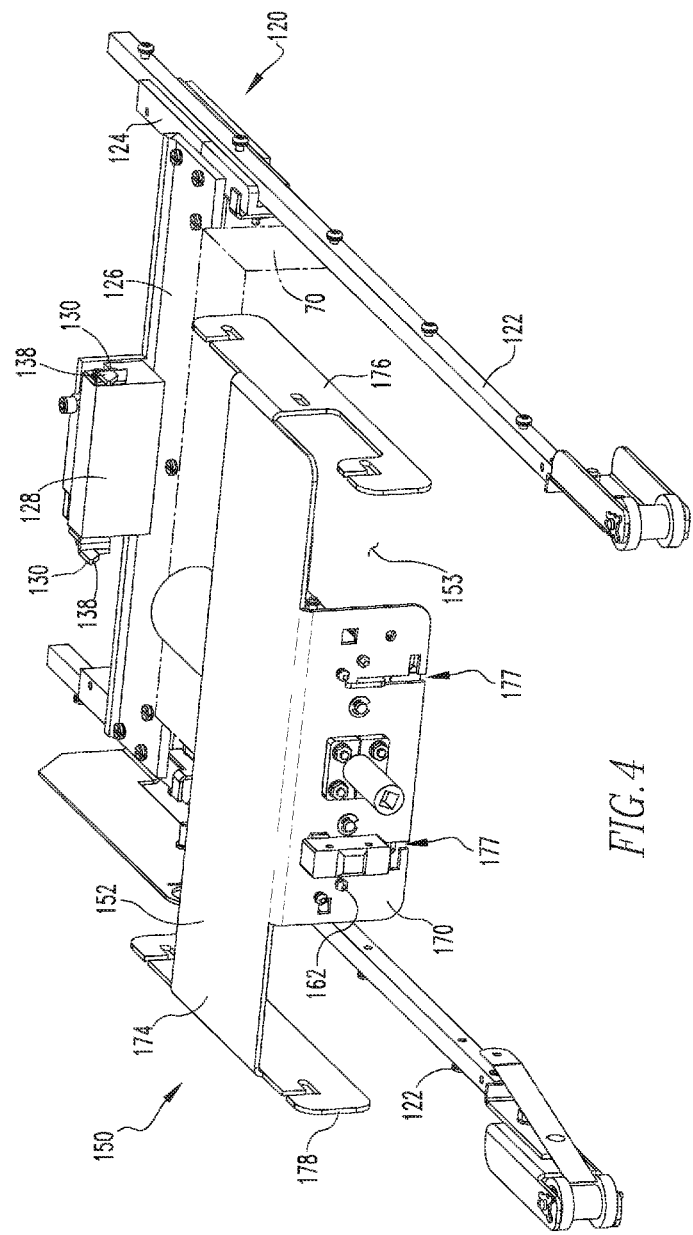
FIG. 4 is an isometric view of a slider assembly and carriage assembly in a connect configuration.

Generally, as noted above, when the circuit breaker assembly 14 is in the inserted, first position, the circuit breaker assembly primary contact assembly 62, i.e., the circuit breaker assembly primary contacts 64, are coupled, or directly coupled, and are in electrical communication with, the frame assembly primary contact assembly 32, i.e., the frame assembly primary contacts 36. Further, when the circuit breaker assembly 14 is in the inserted, first position, the frame assembly secondary contact assembly 34, i.e., the case assembly 40 and the frame assembly secondary contacts 42, are coupled, or directly coupled, and are in electrical communication with, the circuit breaker assembly secondary contact assembly 66, i.e., the circuit breaker assembly secondary contacts 68, as shown in FIG. 4. Thus, this is the "connect configuration" for the circuit breaker assembly 14 and the number of contact assemblies 32, 34, 62, 66 and subcomponents. It is noted that when the circuit breaker assembly 14 and the number of contact assemblies 32, 34, 62, 66 are in the "connect configuration" the frame assembly secondary contact assembly 34, i.e., the case assembly 40, is "adjacent" to the frame assembly enclosed space rear side 24. That is, as used herein, and in relation to the frame assembly secondary contact assembly 34 (and the case assembly 40), "adjacent" is a relative term meaning closer than when the frame assembly secondary contact assembly 34 (and the case assembly 40) is in another position(s), as describe below. Thus, when the circuit breaker assembly 14 is in the inserted, first position, and when the frame assembly secondary contact assembly 34 is in the connect, first position, the configurable electrical components 100 are each in a "connect configuration."

When the circuit breaker assembly 14 is initially moved to the withdrawn, second position, the circuit breaker assembly primary contact assembly 62, i.e., the circuit breaker assembly primary contacts 64, are spaced from, and are not in electrical communication with, the frame assembly primary contact assembly 32, i.e., the frame assembly primary contacts 36, as noted above. Further, initially, the movable frame assembly secondary contact assembly 34 (and the case assembly 40) move into the test, second position, as shown in FIG. 5. When in the second position, the movable frame assembly secondary contact assembly 34 (and the case assembly 40) is adjacent the frame assembly enclosed space front side 22. As before, the term "adjacent" as used herein, and in relation to the frame assembly secondary contact assembly 34 (and the case assembly 40), means closer than when the frame assembly secondary contact assembly 34 (and the case assembly 40) is in another position(s). In this position, the frame assembly secondary contact assembly 34, i.e., the case assembly 40 and the frame assembly secondary contacts 42, are still coupled, or directly coupled, and are in electrical, or electronic, communication with, the circuit breaker assembly secondary contact assembly 66, i.e., the circuit breaker assembly secondary contacts 68. Thus, when the circuit breaker assembly 14 is in the withdrawn, second position, and when the frame assembly secondary contact assembly 34 is in the test, second position, the configurable electrical components 100 are each in a "test configuration."

The frame assembly secondary contact assembly 34 (and the case assembly 40) then move into the disconnect, third position, as shown in FIG. 6. That is, the frame assembly secondary contact assembly 34 (and the case assembly 40) is moved away from the circuit breaker assembly secondary contact assembly 66, and toward the frame assembly enclosed space rear side 24. The circuit breaker assembly secondary contact assembly 66 remains in the second position with the circuit breaker assembly 14. Thus, to separate the frame assembly secondary contact assembly 34 and the circuit breaker assembly secondary contact assembly 66, the frame assembly secondary contact assembly 34 moves toward the frame assembly enclosed space rear side 24. When the frame assembly secondary contact assembly 34 (and the case assembly 40) is moved away from the circuit breaker assembly secondary contact assembly 66, the frame assembly secondary contact assembly 34 and the circuit breaker assembly secondary contact assembly 66 are separated and are not in electric, or electronic, communication. Thus, when the circuit breaker assembly 14 is in the withdrawn, second position, and when the frame assembly secondary contact assembly 34 is in the disconnect, third position, the configurable electrical components 100 are each in a "disconnect configuration." It is noted that when the configurable electrical components 100 are each in a "disconnect configuration," the frame assembly secondary contact assembly 34 (and the case assembly 40) is, in an exemplary embodiment, at a location between the first and second positions.

That is, unlike the known art in which the both the circuit breaker and the secondary contact assemblies move in a single direction between a connect configuration, a test configuration, and a disconnect configuration, in the disclosed and claimed embodiment, the circuit breaker assembly 14 moves between two positions, and the frame assembly secondary contact assembly 34 reverses direction between the second and third positions.

In an exemplary embodiment, the insertion of the circuit breaker assembly 14 into the frame assembly enclosed space 20 is generally the reverse of the removal. That is, the configurable electrical components 100 are each in a "disconnect configuration." The frame assembly secondary contact assembly 34 (and the case assembly 40) is then moved into the test, second position, wherein the configurable electrical components 100 are in the "test configuration," as described above. Then, the circuit breaker assembly 14, as well as the other configurable electrical components 100 are returned to the connect configuration, as described above. Thus, when the frame assembly secondary contact assembly 34 (and the case assembly 40) is moved into the test configuration, the circuit breaker assembly 14 remains in the second position, and, the frame assembly secondary contact assembly 34 (and the case assembly 40) assembly moves from one of the first position or the third position to the second position.

Figure 7:
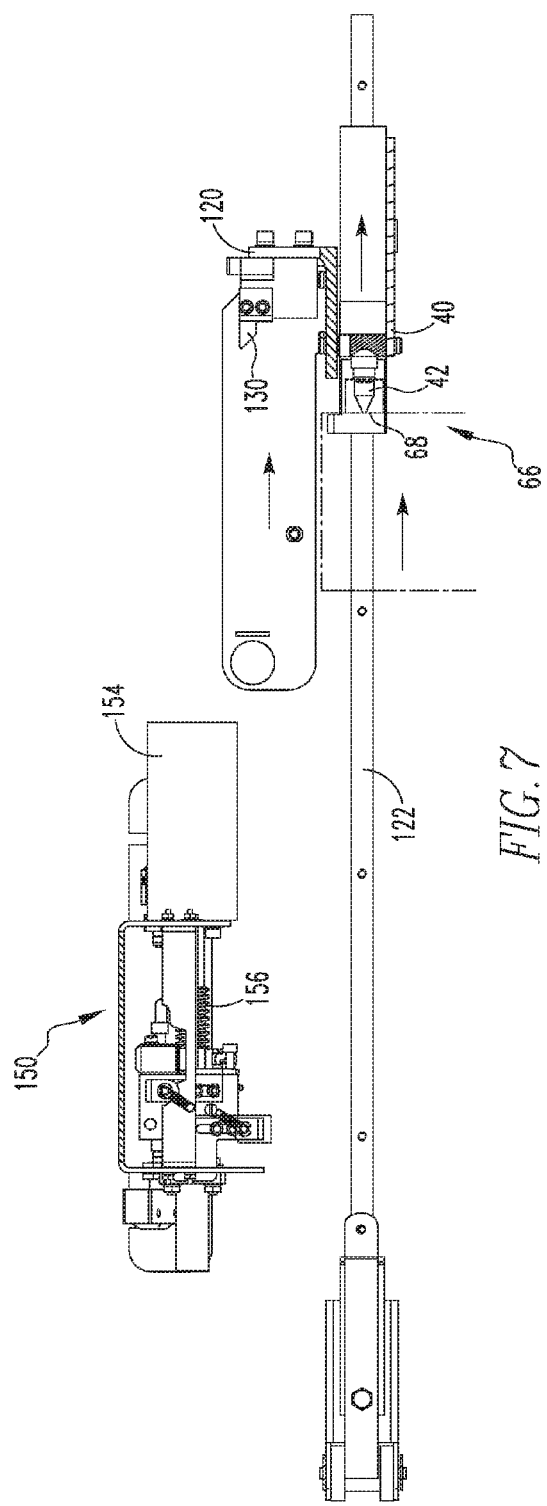
FIG. 7 is a side view of a slider assembly and carriage assembly in a connect configuration.
Figure 8:
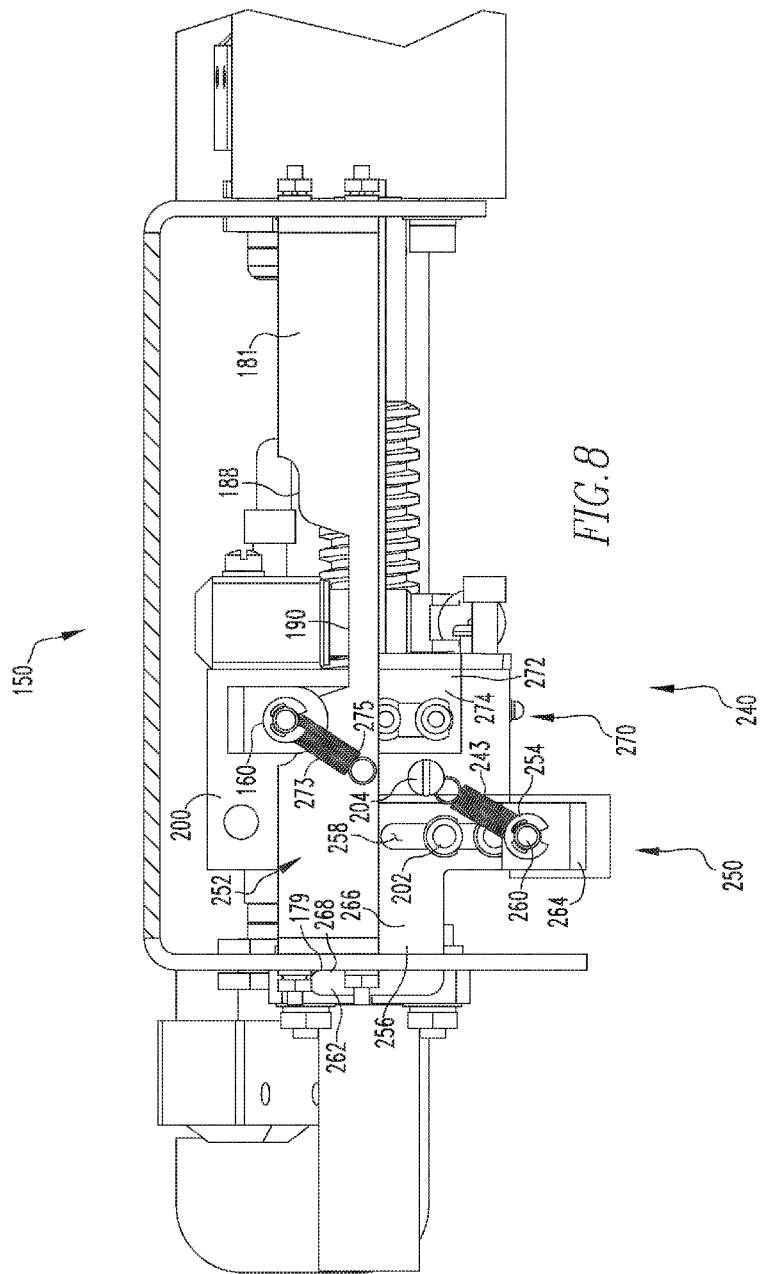
FIG. 8 is a detail view of the carriage assembly of FIG. 7.
Figure 11:
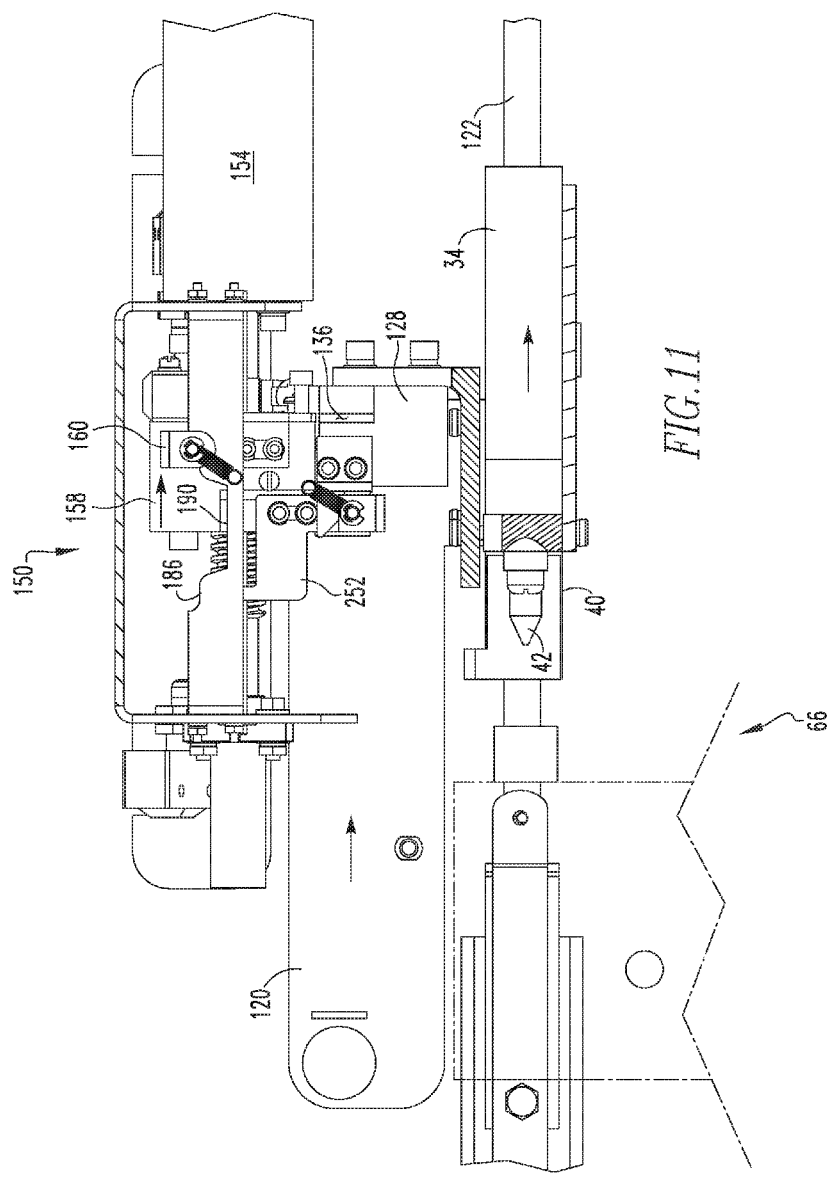
FIG. 11 is a side view of a slider assembly and carriage assembly in a disconnect configuration.
Figure 12:
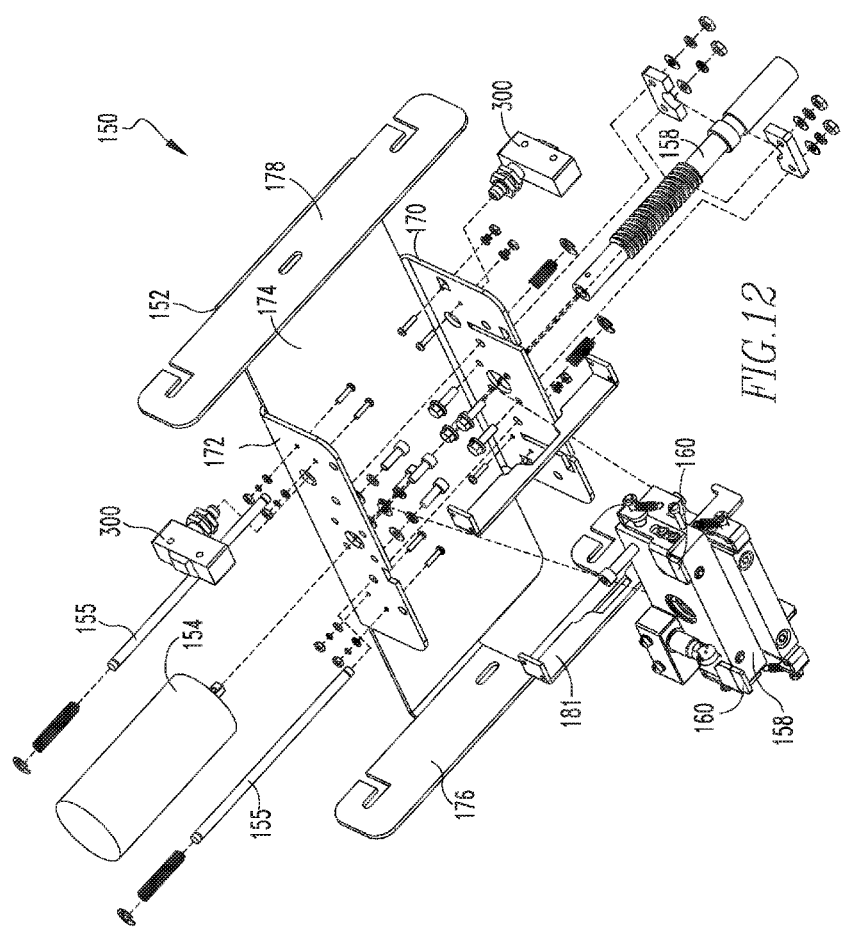
FIG. 12 is an exploded isometric view of a carriage assembly.
Figure 13:
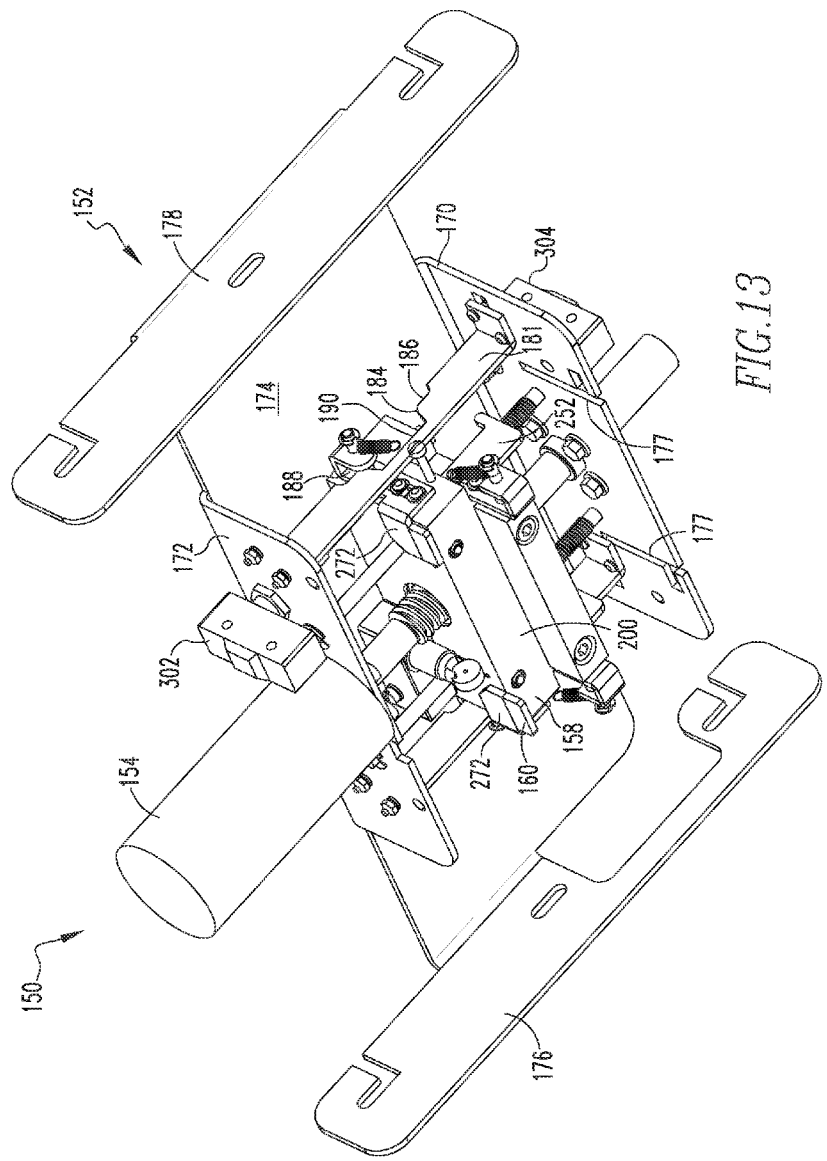
FIG. 13 is an isometric view of a carriage assembly.
Figure 14:
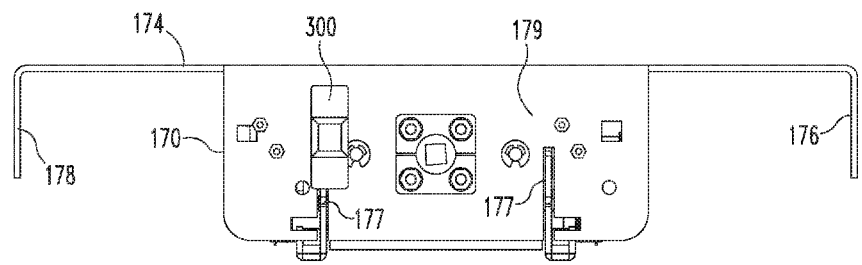
FIG. 14 is a front view of a carriage assembly.
Figure 15:
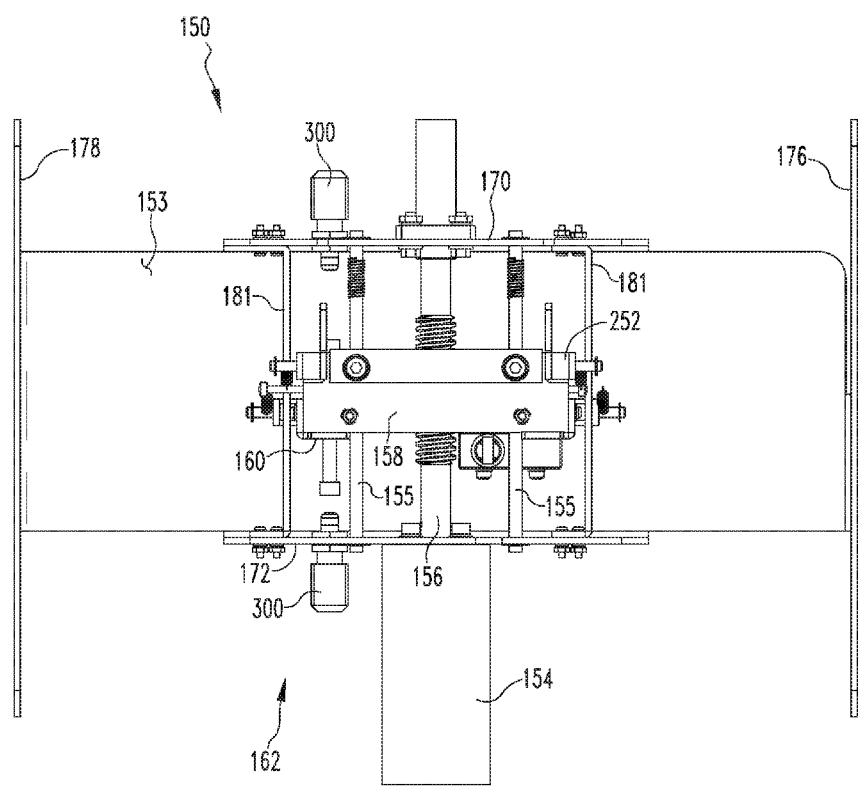
FIG. 15 is a bottom view of a carriage assembly.
Figure 16:
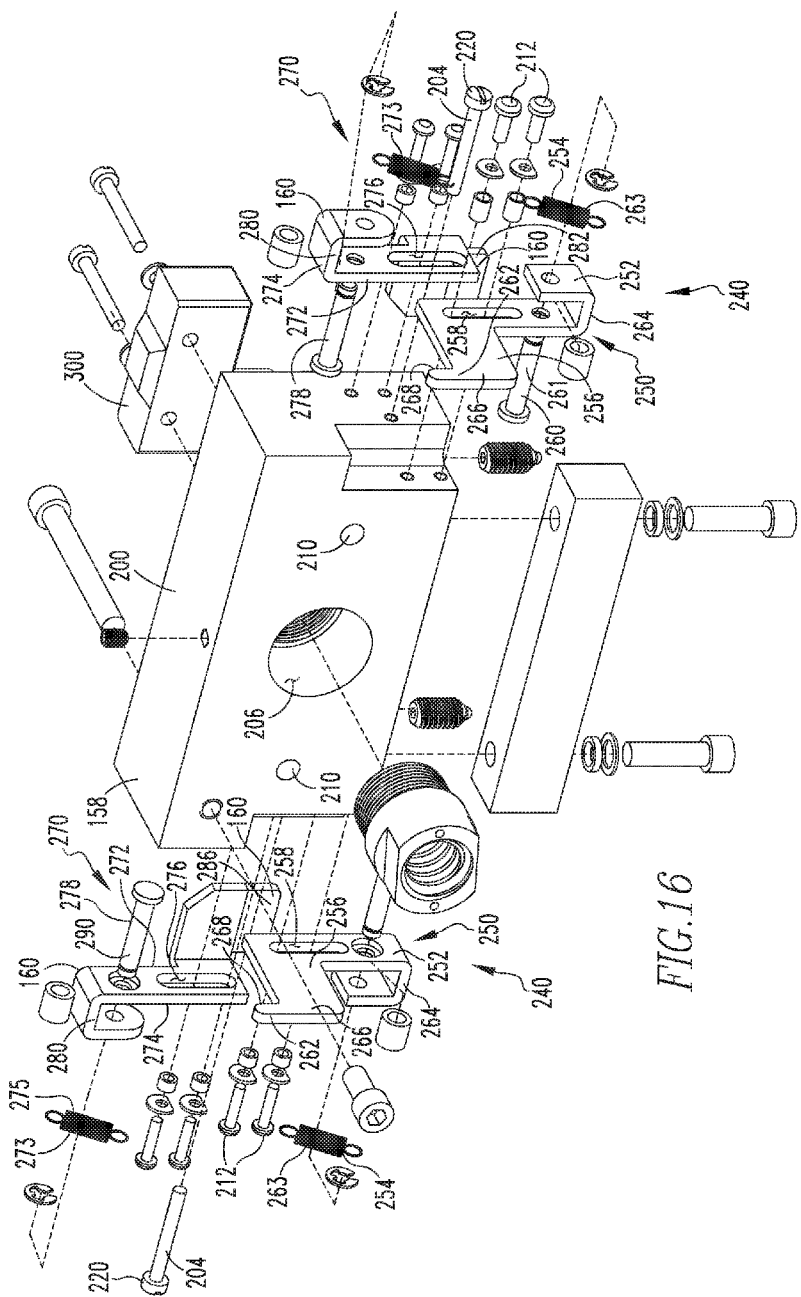
FIG. 16 is an exploded isometric view of a carriage assembly first actuator with interlock assemblies.
Figure 17:
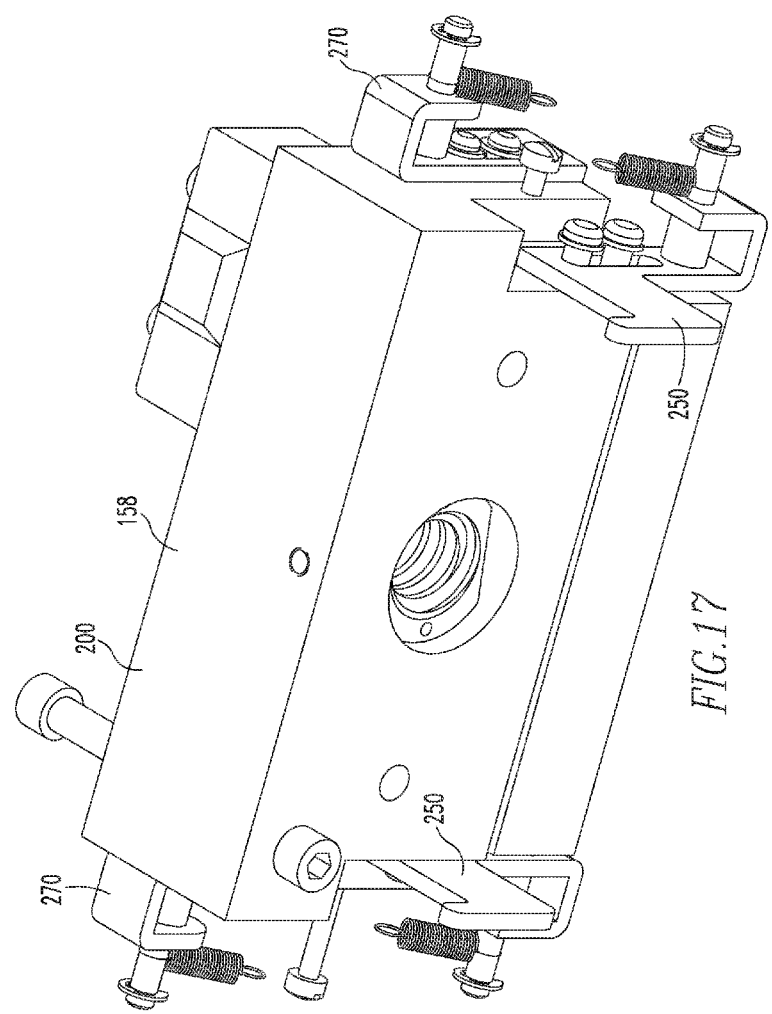
FIG. 17 is an isometric view of a carriage assembly first actuator with interlock assemblies.
Figure 19:
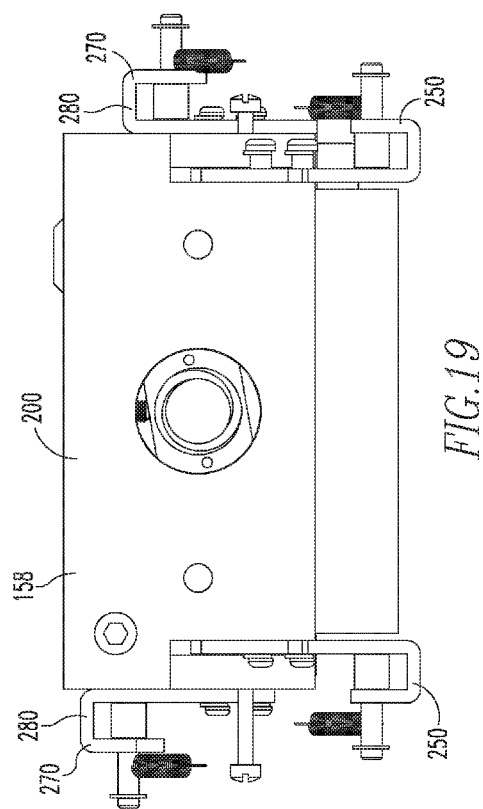
FIG. 19 is a front view of a carriage assembly first actuator with interlock assemblies.
Figure 18:
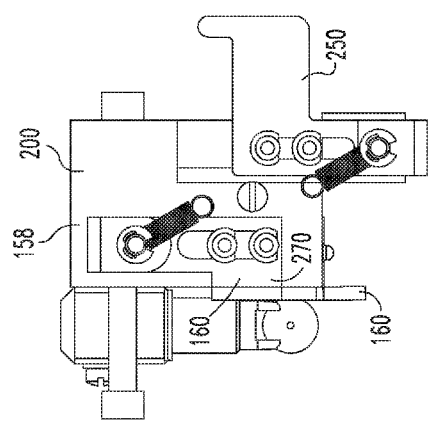
FIG. 18 is a side view of a carriage assembly first actuator with interlock assemblies.

Further, and again noting that as defined herein a "configuration" of an element is determined by the location of other elements, it is noted that when the frame assembly secondary contact assembly 34 (and the case assembly 40) is in said connect configuration, the frame assembly secondary contact assembly 34 (and the case assembly 40) is adjacent to the frame assembly enclosed space rear side 24, as shown in FIGS. 7 and 8. When the frame assembly secondary contact assembly 34 (and the case assembly 40) is in the test configuration, the frame assembly secondary contact assembly 34 (and the case assembly 40) is adjacent the frame assembly enclosed space front side 22, as shown in FIG. 9. When the frame assembly secondary contact assembly 34 (and the case assembly 40) is in the disconnect configuration, the frame assembly secondary contact assembly 34 (and the case assembly 40) is disposed between the first position and the second position, as shown in FIG. 11. Further, when the frame assembly secondary contact assembly 34 (and the case assembly 40) is in the connect configuration, the circuit breaker assembly 14 is in the first position. When the frame assembly secondary contact assembly 34 (and the case assembly 40) is in the test configuration, the circuit breaker assembly 14 is in the second position. When the frame assembly secondary contact assembly 34 (and the case assembly 40) is in the disconnect configuration, the circuit breaker assembly 14 is in the second position.

As shown in FIGS. 12-20, the circuit breaker installation 10 above further includes a number of interlock assemblies 240 structured to ensure selected elements are in the desired positions when the configurable electrical components 100 move between the identified configurations. In an exemplary embodiment, the number of interlock assemblies 250, 270 are included in a carriage assembly 150 that is operatively engaged by a slider assembly 120. It is understood that, and as used herein, "interlock assemblies" operate between a number of components and/or assemblies. Thus, as used herein, the "interlock assemblies" comprise elements that are described below as part of the carriage assembly 150 and the slider assembly 120.

Figure 20:
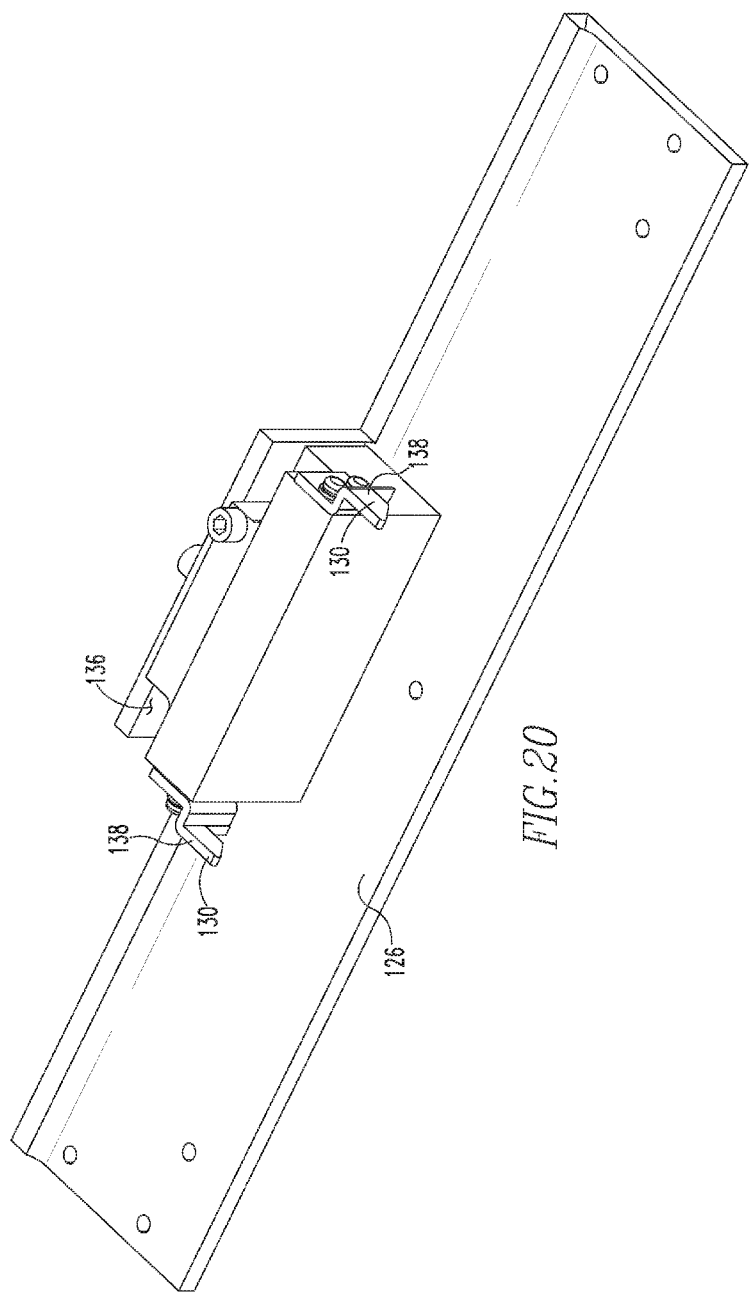
FIG. 20 is an isometric view of a portion of a slider assembly.

That is, in an exemplary embodiment, the frame assembly secondary contact assembly 34 includes a slider assembly 120 and a carriage assembly 150. The slider assembly 120, in an exemplary embodiment, includes a number of tracks (rails) 122, a number of track followers 124, an elongated support member 126, a housing 128 and a number of interlock member operators 130. The slider assembly tracks 122 are coupled, directly coupled, or fixed to the frame assembly 12. The slider assembly support member 126 is, in an exemplary embodiment, a planar member having two lateral ends. That is, the elongated slider assembly support member 126 extends generally laterally in the frame assembly enclosed space 20. A slider assembly track follower 124 is disposed at each lateral end of the slider assembly support member 126. Each slider assembly track follower 124 defines a race sized and shaped to correspond to a slider assembly track 122. Each slider assembly track follower 124 is movably coupled to a slider assembly track 122. The frame assembly secondary contact assembly 34 (and the case assembly 40) is coupled, directly coupled, or fixed to the slider assembly support member 126. The slider assembly housing 128, in an exemplary embodiment, is a block-like body defining a drive cavity 136 (FIG. 11) and supporting the number of slider assembly interlock member operators 130 (FIG. 4). In an exemplary embodiment, the slider assembly interlock member operators 130 are generally planar members 138 generally disposed in a vertical plane and wherein the end facing the frame assembly enclosed space front side 22 is tapered being longer at the upper side, as shown in FIG. 20.

Figure 10:
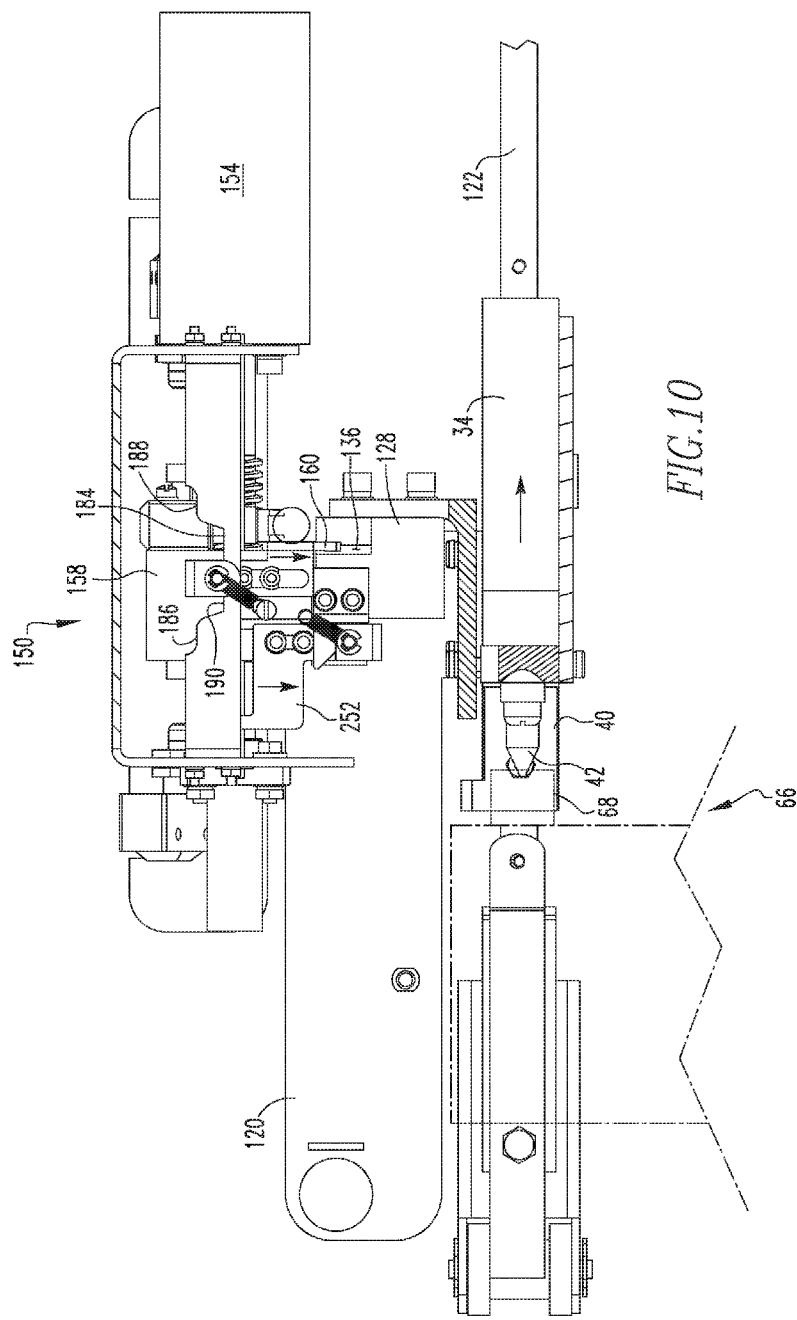
FIG. 10 is a side view of a slider assembly and carriage assembly moving between a test configuration and a disconnect configuration.

The slider assembly 120 is assembled by coupling the slider assembly tracks 122 to the frame assembly 12. As shown, the slider assembly tracks 122 are fixed to a frame assembly top sidewall (not shown for clarity). The slider assembly support member 126 is movably coupled to the slider assembly tracks 122 by positioning the slider assembly tracks 122 within each slider assembly track follower 124. The slider assembly 120 is further coupled, in one configuration, to the circuit breaker assembly 14. That is, the frame assembly secondary contact assembly 34 (and the case assembly 40), which are coupled, directly coupled, or fixed to the slider assembly support member 126, is disposed in the connect configuration. That is, the frame assembly secondary contact assembly 34 is coupled to, and is in electrical communication with, the circuit breaker assembly secondary contact assembly 66. In this configuration, the slider assembly 120 moves with the circuit breaker assembly 14 between the connect position and the test position. These are the connect, first position and the test, second position of the slider assembly 120. Further, the slider assembly 120 moves between the test position and the disconnect position along with the frame assembly secondary contact assembly 34, as described above. This is the disconnect, third position of the slider assembly 120. That is, the slider assembly 120 moves from the connect position forwardly in the frame assembly enclosed space 20 to the test position. The slider assembly 120 moves from the test position rearwardly in the frame assembly enclosed space 20 to the disconnect position, as shown in FIG. 10. As with the frame assembly secondary contact assembly 34, the installation process is, essentially, the reverse of the removal process.

The carriage assembly 150 includes support assembly 152, a motor 154, a threaded rod 156, a first actuator 158, a second actuator 160 and, in an exemplary embodiment, a sensor assembly 162. The carriage assembly 150, and in an exemplary embodiment the carriage assembly support assembly 152, is structured to be, and is, coupled, directly coupled, or fixed to the frame assembly 12. The carriage assembly support assembly 152, in the example shown, includes a front plate 170, a rear plate 172, a top plate 174, and two lateral side plates, i.e., a first lateral side plate 176 and a second lateral side plate 178. In an exemplary embodiment, each "plate" is a generally planar member. The carriage assembly support assembly 152 generally defines an operating space 153 for the carriage assembly first actuator 158 and the carriage assembly second actuator 160.

In an exemplary embodiment, the carriage assembly support assembly front plate 170 (hereinafter "carriage assembly front plate" 170) and the carriage assembly support assembly rear plate 172 (hereinafter "carriage assembly rear plate" 172) are disposed in a spaced relation. The carriage assembly front plate 170 is disposed generally adjacent to the frame assembly enclosed space front side 22. The carriage assembly motor 154 is coupled, directly coupled, or fixed to the carriage assembly rear plate 172. The carriage assembly motor 154 includes a rotating output shaft 180. The carriage assembly motor output shaft 180 is operatively coupled, directly coupled, or fixed to the carriage assembly threaded rod 156. The carriage assembly motor output shaft 180 and the carriage assembly threaded rod 156 share an axis of rotation. The carriage assembly threaded rod 156 is rotatably coupled to, and extends between the carriage assembly front plate 170 and the carriage assembly rear plate 172.

Further, in an exemplary embodiment, the carriage assembly front plate 170 defines a number of latching surfaces 179. As shown, the carriage assembly front plate latching surfaces 179 are disposed adjacent vertical slots 177 in the carriage assembly front plate 170. The carriage assembly front plate latching surfaces 179 are part of the first interlock assembly 250.

In an exemplary embodiment, the carriage assembly support assembly 152 includes a number of elongated rails 181 (which are part of the second interlock assembly). Each carriage assembly support assembly rail 181 (hereinafter "second interlock assembly rail" 181) includes a generally planar body 182 which defines a "multi-level path" 184. That is, each second interlock assembly rail 181 defines a path over which a rail follower 280, discussed below, travels. As shown, each rail planar body 182 is disposed in a generally vertical plane and extends between, and is coupled, directly coupled, or fixed to the carriage assembly front plate 170 and the carriage assembly rear plate 172.

In this orientation (as shown for example in FIG. 10), (and with a rail follower 280 biased downwardly as described below) the upper surface of each rail planar body 182 defines the "multi-level path" 184. As used herein, and with each rail planar body 182 in the orientation described above, a "multi-level path" is a path that includes portions at different elevations. It is understood that the "multi-level path" includes transitory portions between specific elevations. It is understood that the rail multi-level path 184 on different rails 181 generally correspond to each other. In an exemplary embodiment, each rail multi-level path 184 includes a number of release portions 186, 188 and a drive portion 190. In the embodiment shown, the rail multi-level path release portions 186, 188 are each generally planar and are disposed at about the same elevation. The rail multi-level path drive portion 190 is disposed at a lower elevation. Further, the rail multi-level path release portions 186, 188 are disposed on either side of the rail multi-level path drive portion 190. The rail multi-level path release portions 186, 188 and rail multi-level path drive portion 190 have a sufficient length to cause the motion of the second interlock assembly interlock member body 274, as described below.

Generally, the carriage assembly first actuator 158 and carriage assembly second actuator 160 are structured to be operatively coupled to the slider assembly 120 and move the slider assembly 120, and therefore the frame assembly secondary contact assembly 34, between the test, second position and the disconnect, third position. In an exemplary embodiment, the carriage assembly first actuator 158 is structured to travel over a path extending in a direction between the frame assembly enclosed space front side 22 and the frame assembly enclosed space rear side 24. Further, the carriage assembly second actuator 160 is structured to be selectively coupled to the slider assembly 120. That is, the carriage assembly second actuator 160 moves between a disengaged (or release) position, wherein the carriage assembly second actuator 160 is not operatively engaged to the slider assembly 120, and an engaged (or drive) position, wherein the carriage assembly second actuator 160 is operatively engaged to the slider assembly 120.

The carriage assembly first actuator 158 includes a body 200 having a number of interlock member mountings 202 and a number of biasing device mountings 204. Further, the carriage assembly first actuator body 200 defines a threaded passage 206 that corresponds to the carriage assembly threaded rod 156. In an exemplary embodiment, the carriage assembly first actuator body 200 includes a generally planar upper surface (not shown). Further, the carriage assembly first actuator body 200 generally corresponds to the carriage assembly support assembly operating space 153. Thus, when assembled, the carriage assembly first actuator body upper surface is disposed immediately adjacent the carriage assembly support assembly top plate 174. As described below, the carriage assembly first actuator body 200 is operatively coupled to the carriage assembly threaded rod 156. In this configuration, interference between the carriage assembly first actuator body upper surface and the carriage assembly support assembly top plate 174 prevent rotation of the carriage assembly first actuator body 200 when carriage assembly threaded rod 156 is rotated.

Alternately, or additionally, the carriage assembly support assembly 152, in an exemplary embodiment, includes guide rods 155. That is, the carriage assembly support assembly guide rods 155 are coupled, directly coupled, or fixed to, and extend between the carriage assembly front plate 170 and the carriage assembly rear plate 172. The carriage assembly support assembly guide rods 155 extend generally parallel to the carriage assembly threaded rod 156 axis of rotation. In this embodiment, the carriage assembly first actuator body 200 also includes guide rod passages 210 that correspond to the carriage assembly support assembly guide rods 155. The carriage assembly first actuator body guide rod passages 210 extend generally parallel to the carriage assembly first actuator body threaded passage 206.

Each carriage assembly first actuator body interlock member mounting 202 is structured to have an interlock member 252, 272 movable coupled thereto. In an exemplary embodiment, each carriage assembly first actuator body interlock member mounting 202 is structured to allow an interlock member 252, 272 to move over a generally straight path.

Thus, in an exemplary embodiment, each carriage assembly first actuator body interlock member mounting 202 includes two spaced rods 212 extending laterally from each lateral side of the carriage assembly first actuator body 200. In this configuration, each interlock member 252, 272 includes a slot through which the carriage assembly first actuator body interlock member mounting rods 212 extend, as described below. Alternatively, each carriage assembly first actuator body interlock member mounting 202 is an elongated lug and each interlock member 252, 272 defines a race into which each lug is disposed.

Each carriage assembly first actuator body biasing device mounting 204 is, in an exemplary embodiment, a laterally extending rod 220 structured to be coupled to a spring 263.

In an exemplary embodiment, the carriage assembly second actuator(s) 160 are a number of tabs, i.e., generally protruding planar members, that are sized and shaped to fit within the slider assembly housing drive cavity 136. In an exemplary embodiment, the carriage assembly second actuator(s) 160 are unitary with the second interlock assembly interlock member 272 and are discussed in more detail below.

In an exemplary embodiment, the number of interlock assemblies 240 includes a first interlock assembly 250 and a second interlock assembly 270. As used herein, an "interlock assembly" is an element or assembly for preventing a mechanism from being set in motion when another mechanism is in such a position that the two operating simultaneously might produce undesirable results. As noted above, the first interlock assembly 250 and the second interlock assembly 270 interact with, and therefore include, elements of the slider assembly 120 and the carriage assembly 150.

The first interlock assembly 250 is structured to substantially ensure the carriage assembly first actuator 158 is in the "test position," as discussed below, prior to the carriage assembly first actuator 158 moving toward the "disconnect position," as discussed below. Generally, the first interlock assembly 250 latches the carriage assembly first actuator 158 to the carriage assembly front plate 170. The first interlock assembly 250 includes a number of interlock members 252 and a number of biasing devices 254. In an exemplary embodiment, the first interlock assembly interlock members 252 are substantially similar and are movably coupled to each lateral side of the carriage assembly first actuator body 200. As the first interlock assembly interlock members 252 are substantially similar, only one will be described. It is understood that the other first interlock assembly interlock member 252 is substantially similar, but is, in an exemplary embodiment, a mirror image thereof.

The first interlock assembly interlock member 252 includes a body 256 having a slot 258, a number of biasing device mounting 260, a latching portion 262, and a number of interlock member operator portions 264. In an exemplary embodiment, the first interlock assembly interlock member body 256 is a unitary body. As shown, in an exemplary embodiment, the first interlock assembly interlock member body 256 is movably coupled to the carriage assembly first actuator body 200 with the carriage assembly first actuator body interlock member mounting 202, as shown, carriage assembly first actuator body interlock member mounting rods 212 disposed in the first interlock assembly interlock member body slot 258. In an exemplary embodiment, and when installed, the first interlock assembly interlock member body slot 258 extends generally vertically. In this configuration, the first interlock assembly interlock member body 256 is movable between a latched, first position and an unlatched second position.

That is, the first interlock assembly interlock member body latching portion 262 includes a forwardly extending member 266 with a latching surface 268. In an exemplary embodiment, the first interlock assembly interlock member body latching portion forwardly extending member 266 is generally planar and is sized and shaped to pass through the carriage assembly front plate vertical slots 177. The first interlock assembly interlock member body biasing device mounting(s) 260 are laterally extending rods 261. The first interlock assembly interlock member body interlock member operator portion(s) 264 are, in an exemplary embodiment, planar members generally disposed in a horizontal plane. The first interlock assembly biasing device(s) 254 are, in an exemplary embodiment, springs 263.

The first interlock assembly 250 operates, generally, as follows. The carriage assembly first actuator body interlock member mounting rods 212 are disposed in the first interlock assembly interlock member body slot 258. In this configuration, the first interlock assembly interlock member body 256 is movable between an upper, latched, first position and a lower, unlatched second position. The first interlock assembly biasing device(s) 254 are coupled, directly coupled, or fixed to, and extend between the carriage assembly first actuator body 200 biasing device mounting(s) 204 and the first interlock assembly interlock member body biasing device mounting(s) 260 and are structured to bias the first interlock assembly interlock member body 256 to the first position.

When the carriage assembly first actuator body 200 is in the test position, the first interlock assembly interlock member body latching portion 262 is disposed through the carriage assembly front plate vertical slots 177. Further, when the first interlock assembly interlock member body 256 is in first position, the first interlock assembly interlock member body latching portion 262, and in an exemplary embodiment, the first interlock assembly interlock member body latching portion latching surface 268 is disposed adjacent to the carriage assembly front plate latching surfaces 179. If the carriage assembly first actuator body 200 attempts to move from the test position to the disconnect position, the first interlock assembly interlock member body latching portion latching surface 268 engages the carriage assembly front plate latching surfaces 179 and prevents the carriage assembly first actuator body 200 from moving toward the disconnect position.

The first interlock assembly interlock member body 256 is moved to the second position by the slider assembly 120. That is, as the slider assembly 120 moves from the connect, first position to the test, second position, the slider assembly interlock member operators 130 operatively engage the first interlock assembly interlock member body interlock member operator portion(s) 264 causing the first interlock assembly interlock member body 256 to move to the second position. When first interlock assembly interlock member body 256 is in the second position, the first interlock assembly interlock member body latching portion 262, and in an exemplary embodiment, the first interlock assembly interlock member body latching portion latching surface 268 is disposed adjacent carriage assembly front plate vertical slots 177. Thus, when the carriage assembly first actuator 158 moves to the disconnect position, the first interlock assembly interlock member body latching portion 262 passes through the carriage assembly front plate vertical slots 177.

Generally, when the carriage assembly first actuator body 200 moves from the disconnect, third position to the test, second position, then as the slider assembly 120 moves from the test, second position to the connect, first position, the reverse actions are accomplished. That is, for example, as the carriage assembly first actuator 158 moves from the disconnect, third position to the test, second position, the first interlock assembly interlock member body latching portion 262 passes through the carriage assembly front plate vertical slots 177. Further, as the slider assembly 120 moves from the test, second position to the connect, first position, the slider assembly interlock member operators 130 disengage the first interlock assembly interlock member body interlock member operator portion(s) 264 causing the first interlock assembly interlock member body 256 to move to the first position.

Thus, the first interlock assembly 250 is structured to maintain the carriage assembly first actuator 158 in the test position when the configurable electrical components 100 are in the connect configuration and to allow the carriage assembly first actuator 158 to move between the test position and the disconnect position when the configurable electrical components 100 are in one of, or in between, the test configuration or the disconnect configuration.

The second interlock assembly 270 includes a number of interlock members 272, a number of biasing devices 273, and a number of elongated rails which are, in an exemplary embodiment, carriage assembly support assembly rails 181 which are also identified as a "second interlock assembly rail" 181. The second interlock assembly interlock members 272 are substantially similar, only one will be described. It is understood that the other second interlock assembly interlock member 272 is substantially similar, but is, in an exemplary embodiment, a mirror image thereof. The second interlock assembly number of biasing devices 273 are, in an exemplary embodiment, springs 275.

In an exemplary embodiment, the second interlock assembly interlock member 272 includes a body 274 with a slot 276, a biasing device mounting 278, a rail follower 280, and a drive member 282. In an exemplary embodiment, the second interlock assembly interlock member body 274 is a unitary body. Further, the second interlock assembly interlock member body drive member 282 is the carriage assembly second actuator 160. Thus, the second interlock assembly interlock member body drive member 282 is a tab, i.e., generally protruding planar members, that are sized and shaped to fit within the slider assembly housing drive cavity 136. In an exemplary embodiment, and when installed, the second interlock assembly interlock member body slot 276 extends generally vertically. In this configuration, the second interlock assembly interlock member body 274 is movably coupled to said carriage assembly first actuator body 200 and structured to move between a disengaged (or release), first position, wherein the second interlock assembly interlock member body drive member 282 is not operatively engaged to the slider assembly 120, and an engaged (or drive), second position, wherein the second interlock assembly interlock member body drive member 282 is operatively engaged to the slider assembly 120. The second interlock assembly interlock member body biasing device mounting(s) 278 are laterally extending rods 290. The second interlock assembly interlock body rail follower 280 is an inverted channel sized to correspond to the second interlock assembly rail 181.

The second interlock assembly 270 is assembled as follows. Each second interlock assembly rail 181 is coupled to the frame assembly 12 as described above. Each second interlock assembly interlock member body 274 is movably coupled to an associated second interlock assembly rail 181. A second interlock assembly biasing device(s) 273 are coupled, directly coupled, or fixed to, and extend between the carriage assembly first actuator body 200 biasing device mounting(s) 204 and a second interlock assembly interlock member body biasing device mounting(s) 278 and are structured to bias the second interlock assembly interlock member body 274 to the second position. That is, the second interlock assembly interlock member body 274 is generally biased downwardly.

The second interlock assembly 270 operates as follows. When the carriage assembly first actuator body 200 is in the test position, the second interlock assembly interlock member body 274, and as shown, the second interlock assembly interlock body rail follower 280, is disposed over the forward rail multi-level path release portion 186. As the forward rail multi-level path release portion 186 is at a relatively higher elevation, the second interlock assembly interlock member body 274 is in the first position. As the carriage assembly first actuator body 200 moves from the test position to the disconnect position, i.e., toward the frame assembly enclosed space rear side 24, the second interlock assembly interlock body rail follower 280 moves over a transition portion of the rail multi-level path 184 to the rail multi-level path drive portion 190. Due to the bias of the second interlock assembly biasing device(s) 273, the second interlock assembly interlock member body 274 is biased, and moves, downwardly. As the second interlock assembly interlock member body 274 moves downwardly, the second interlock assembly interlock member body drive member 282 moves into the slider assembly housing drive cavity 136. As noted above the carriage assembly first actuator body 200 can only move between the test position and the disconnect position when the slider assembly 120 is in the test position. It is understood that when the slider assembly 120 is in the test position, the slider assembly housing drive cavity 136 is disposed generally below the second interlock assembly interlock member body drive member 282. Further, when the second interlock assembly interlock member body drive member 282 is in the slider assembly housing drive cavity 136, the carriage assembly first actuator body 200 operatively engages the second interlock assembly interlock member body 274 and causes the second interlock assembly interlock member body 274 to move rearwardly in the frame assembly enclosed space 20. That is, the second interlock assembly interlock member body 274, and the second interlock assembly interlock member body drive member 282, operatively engage the slider assembly 120 causing the slider assembly 120, and the frame assembly secondary contact assembly 34 (and the case assembly 40), to the disconnect position. As the carriage assembly first actuator body 200 nears the disconnect position, the second interlock assembly interlock body rail follower 280 moves over a transition portion to the rearward, rail multi-level path release portion 188 of the rail multi-level path 184 to the rail multi-level path drive portion 190. As the second interlock assembly interlock body rail follower 280 moves over rearward, rail multi-level path release portion 188, the second interlock assembly interlock member body 274, and the second interlock assembly interlock member body drive member 282, no longer operatively engage the slider assembly 120 causing the slider assembly 120 to cease moving. Generally, when the carriage assembly first actuator body 200 moves from the disconnect, third position to the test, second position, then as the slider assembly 120 moves from the test, second position to the connect, first position, the reverse actions of the second interlock assembly 270 are accomplished.

Thus, the second interlock assembly 270 is structured to maintain the carriage assembly second actuator 160 in the disengaged position when the configurable electrical components 100 are in one of the test configuration and the disconnect configuration, and to allow the carriage assembly second actuator 160 to move into the engaged position as the configurable electrical components 100 are moving between the test configuration and the disconnect configuration. Further, when the configurable electrical components are in one of the test configuration and the disconnect configuration, each of the second interlock assembly interlock member body rail follower 280 is disposed on one of the second interlock assembly rail release portion 186 wherein each the second interlock assembly interlock member drive member 282 is spaced from the frame assembly secondary contact assembly 34 housing, and, as the configurable electrical components are moving between the test configuration and the disconnect configuration, each the second interlock assembly interlock member body rail follower 280 is disposed on the second interlock assembly rail drive portion, wherein each the second interlock assembly interlock member drive member 282 is disposed in the frame assembly secondary contact assembly housing drive cavity 136.

In an exemplary embodiment, the carriage assembly sensor assembly 162 includes a number of sensors 300 such as, but not limited to, sensors structured to detect the proximity of another element. For example, a sensor 300, in an exemplary embodiment, includes an actuator disposed in the path of travel of any movable element, such as, but not limited to any configurable electrical component, described above. The sensors 300 are positioned so that the sensor is actuated when a movable element is in a specific position. For example, a sensor is, in an exemplary embodiment, disposed adjacent the path of travel of carriage assembly first actuator body 200 and is positioned to be actuated when the carriage assembly first actuator body 200 is in the disconnect position. Thus, the carriage assembly sensor assembly 162 is structured to provide data as to the position of any movable element, such as, but not limited to any configurable electrical component, described above. In an exemplary embodiment, the carriage assembly sensor assembly number of sensors 300 includes a disconnect limit switch 302 and a test limit switch 304. The disconnect limit switch 302 is coupled to the carriage assembly rear plate 172, wherein the disconnect limit switch 302 is structured to detect a proximate object when the configurable electrical components 100 are in the disconnect configuration. Similarly, the test limit switch 304 is coupled to the carriage assembly front plate 170, wherein the test limit switch 304 is structured to detect a proximate object when the configurable electrical components 100 are in the test configuration.

Further, in an exemplary embodiment, the slider assembly 120 and the carriage assembly 150 are each an added assembly, as defined above.

Figure 21:
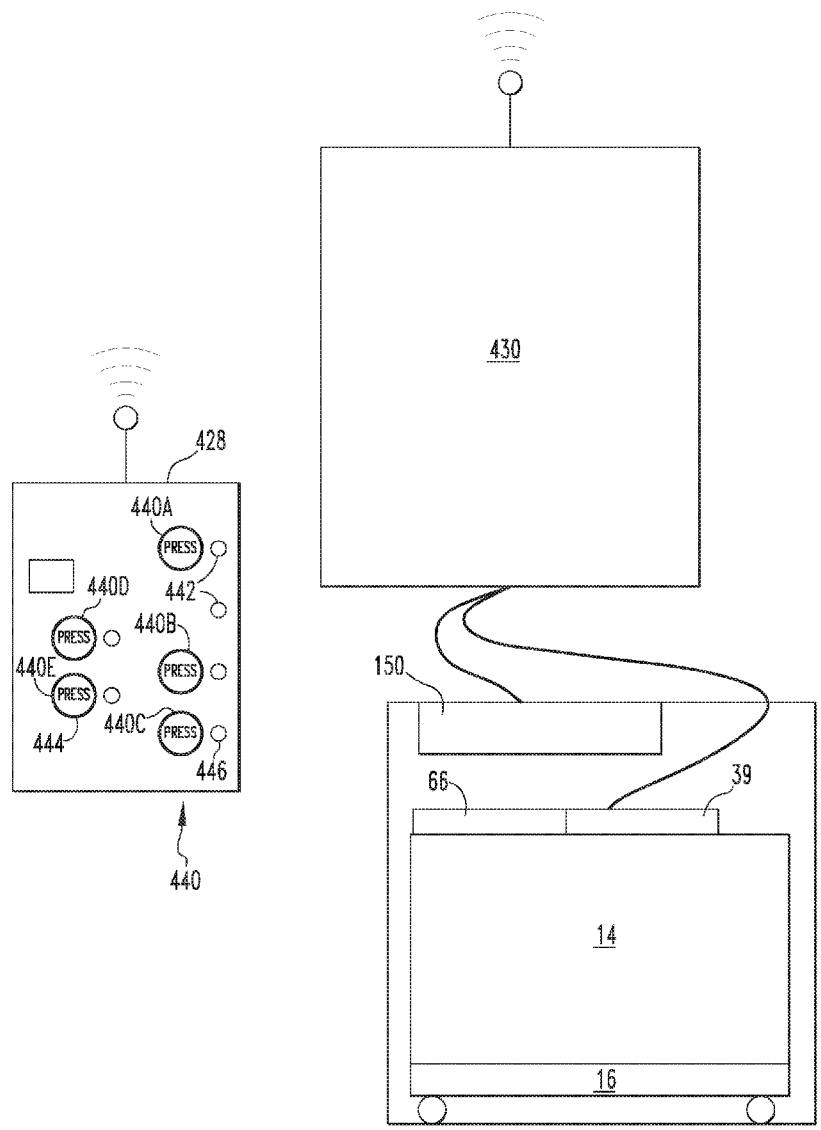
FIG. 21 is a schematic view of another embodiment.
Figure 22:
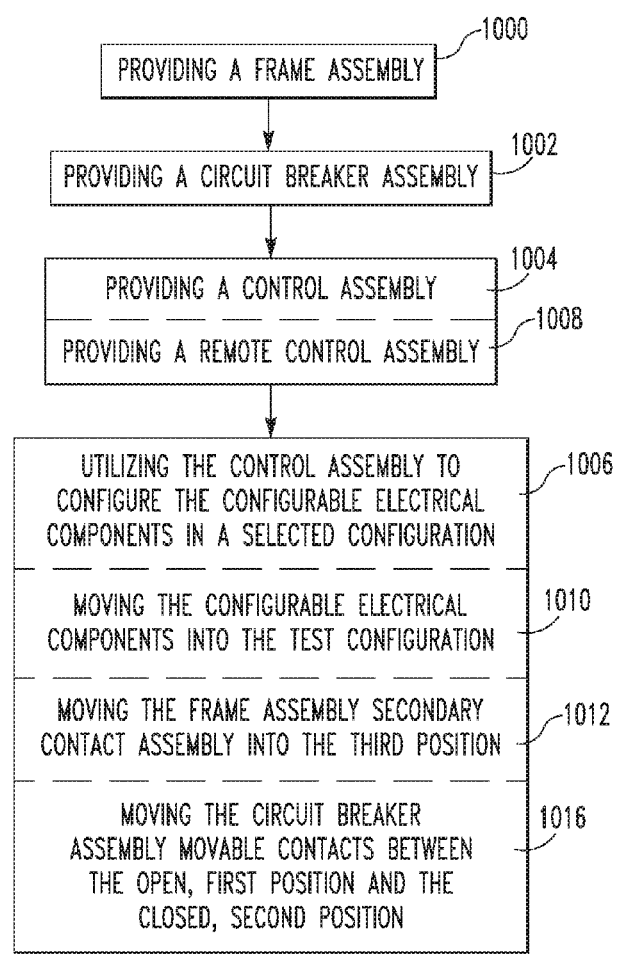
FIG. 22 is a flowchart of the disclosed method.

In another exemplary embodiment, shown in FIG. 21, the control assembly 28 is a remote control assembly 428. That is, in an exemplary embodiment, the remote control assembly 428 further includes a programmable logic circuit assembly 430 (hereinafter "PLC assembly" 430) including wireless input/output assemblies, sensors, memory (none shown), as well as wiring and/or wireless communication with the frame assembly 12, circuit breaker assembly 14, the frame assembly secondary contact assembly 34, slider assembly 120 and/or the carriage assembly 150. The PLC assembly 430, in an exemplary embodiment, is in wireless communication with the remote control assembly 428. The remote control assembly 428 is in electronic communication with the racking assembly 16 and the carriage assembly motor 154 and is structured to move the configurable electrical components 100 to be placed in a selected configuration. The remote control assembly 428 is also in electronic communication with the carriage assembly sensor assembly 162 as well as other sensors.

The remote control assembly 428 also includes input elements 440 and output elements 442. In an exemplary embodiment, the input elements 440 are buttons 444 which, when actuated cause the remote control assembly 428 to move the circuit breaker assembly 14 and the frame assembly secondary contact assembly 34, as well as the slider assembly 120 and the carriage assembly 150, to the various configurations discussed above. That is, in an exemplary embodiment, the remote control assembly 428 includes a "connect" input element 440A, a "test" input element 440B, and a "disconnect" input element 440C. The remote control assembly 428 also includes an "open" input element 440D and a "close" input element 440E which control the configuration of the contacts within the circuit breaker assembly 14 to open and close. When a selected input element 400 is actuated, the remote control assembly 428 causes the configurable electrical components 100 to be placed in the identified configuration.

For example, if the configurable electrical components 100 are in the connect configuration, as described above, and a user actuates the "test" input element 440B, then the remote control assembly 428 actuates the racking assembly 16 to move the circuit breaker assembly 14 from the inserted, first position to the withdrawn, second position. A further actuation of the "disconnect" input element 440C causes the carriage assembly motor 154 to actuate and move the slider assembly 120 from the test, second position to the disconnect, third position.

The remote control assembly output elements 442 are, in an exemplary embodiment, lights 446 that are structured to receive the output from the sensor assembly 162. That is, for example, a remote control assembly output element 442 disposed adjacent the "test" input element 440B is structured to receive output from test limit switch 304. Thus, when the test limit switch 304 is actuated by the configurable electrical components 100 being in the test configuration, the remote control assembly output element 442 disposed adjacent the "test" input element 440B is illuminated.

Thus, a method of utilizing the circuit breaker installation 10 including a number of configurable electrical components 100 includes, providing 1000 a frame assembly 12 as described above, providing 1002 a circuit breaker assembly 14, as described above, providing 1004 a control assembly 28, and utilizing 1006 the control assembly 28 to configure the configurable electrical components 100 in a selected configuration, as described above.

Providing 1004 a control assembly 28 includes providing 1008 a remote control assembly 428.

Utilizing 1006 the control assembly 28 to configure the configurable electrical components 100 in a selected configuration further includes the following. Moving 1010 the configurable electrical components 100 into the test configuration (described above) by moving the frame assembly secondary contact assembly 34 from one of the first position or the third position (as described above) to the second position (as described above) while the circuit breaker assembly 14 remains in the second position. Moving 1012 the frame assembly secondary contact assembly 34 into the third position that is disposed between the first position and the second position. Moving 1016 the circuit breaker assembly movable contacts 54 between the open, first position and the closed, second position. While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A frame assembly secondary contact assembly for a circuit breaker installation, said circuit breaker installation including a frame assembly and a circuit breaker assembly, said frame assembly including a conductor assembly, said frame assembly defining an enclosed space, said frame assembly enclosed space including a front side and a rear side, said frame assembly conductor assembly including a primary contact assembly, said frame assembly primary contact assembly including a number of primary contacts, said circuit breaker assembly including a housing assembly and conductor assembly, said circuit breaker assembly conductor assembly including a number of primary contacts, a number of secondary contacts, said circuit breaker assembly movably disposed in said frame assembly enclosed space, wherein said circuit breaker assembly moves between an inserted, first position and a withdrawn, second position, said frame assembly secondary contact assembly comprising:
   a case assembly;
   a number of secondary contacts;
   said number of secondary contacts disposed in said case assembly;
   a slider assembly, said slider assembly structured to be movably coupled to said frame assembly;
   said case assembly fixed to said slider assembly;
   a carriage assembly, said carriage assembly structured to be coupled to said frame assembly;
   said case assembly moves between a connect, first position, a test, second position, and a disconnect, third position;
      wherein said case assembly moves between a connect configuration, wherein said circuit breaker assembly primary contacts are coupled to, and in electrical communication with, said frame assembly primary contacts and said circuit breaker assembly secondary contacts are coupled to, and in electrical communication with, said frame assembly secondary contacts, a test configuration, wherein said circuit breaker assembly primary contacts are not coupled to, and are not in electrical communication with, said frame assembly secondary contacts and said circuit breaker assembly secondary contacts are coupled to, and in electrical communication with, said frame assembly secondary contacts, and, a disconnect configuration, wherein said circuit breaker assembly primary contacts are not coupled to, and are not in electrical communication with, said frame assembly primary contacts, and, said circuit breaker assembly secondary contacts are not coupled to, and are not in electrical communication with, said frame assembly secondary contacts; and
      wherein, when said case assembly is moved into said test configuration, said circuit breaker assembly remains in said second position, and, said case assembly moves from one of said first position or said third position to said second position.

2. The frame assembly secondary contact assembly of claim 1 wherein:
   when said case assembly is in said connect configuration, said case assembly is adjacent to said frame assembly enclosed space rear side;
   when said case assembly is in said test configuration, said case assembly is adjacent said frame assembly enclosed space front side; and
   when said case assembly is in said disconnect configuration, said case assembly is between said first position and said second position.

3. The frame assembly secondary contact assembly of claim 1 wherein:
   when said case assembly is in said connect configuration, said case assembly is in said first position;
   when said case assembly is in said test configuration, said case assembly is in said second position; and
   when said case assembly is in said disconnect configuration, said case assembly is in said third position.

4. The frame assembly secondary contact assembly of claim 3 wherein:
   when said case assembly is in said connect configuration, said circuit breaker assembly is in said first position;
   when said case assembly is in said test configuration, said circuit breaker assembly is in said second position; and
   when said case assembly is in said disconnect configuration, said circuit breaker assembly is in said second position.

5. The frame assembly secondary contact assembly of claim 1 wherein:
   said carriage assembly including a first actuator and a second actuator;
   said carriage assembly first actuator movable between a test position and a disconnect position;
   said carriage assembly second actuator movable between a disengaged position and an engaged position;
   said frame assembly and said circuit breaker assembly include a number of interlock assemblies;
   said number of interlock assemblies includes a first interlock assembly and a second interlock assembly;
   said first interlock assembly structured to maintain said carriage assembly first actuator in said test position when said configurable electrical components are in said connect configuration and to allow said carriage assembly first actuator to move between said test position and said disconnect position when said configurable electrical components are in one of, or in between, said test configuration or said disconnect configuration; and
   said second interlock assembly structured to maintain said carriage assembly second actuator in said disengaged position when said configurable electrical components are in one of said test configuration and said disconnect configuration, and to allow said carriage assembly second actuator to move into said engaged position as said configurable electrical components are moving between said test configuration and said disconnect configuration.

6. The frame assembly secondary contact assembly of claim 5 wherein:
   said carriage assembly includes a front plate, a motor, a threaded rod, and a rear plate;
   said carriage assembly front plate defining a number of latching surfaces; said carriage assembly motor including a rotating output shaft;
   said carriage assembly motor coupled to said carriage assembly rear plate;
   said carriage assembly motor output shaft operatively coupled to said carriage assembly threaded rod;

said carriage assembly threaded rod extending between, and rotatably coupled to, said carriage assembly front plate and said carriage assembly rear plate;

carriage assembly first actuator including a body having a number of interlock member mountings and a number of biasing device mountings;

carriage assembly first actuator body defining a threaded passage;

said carriage assembly threaded rod operatively coupled to said carriage assembly first actuator body threaded passage;

said first interlock assembly including a number of interlock members and a number of biasing devices;

each first interlock assembly interlock member including a body having a slot, a biasing device mounting, a latching portion, and a number of interlock member operator portions;

each first interlock assembly interlock member body movably coupled to said carriage assembly first actuator body and structured to move between a latched, first position and an unlatched second position;

each first interlock assembly interlock biasing device extending between, and coupled to both, one said carriage assembly first actuator body biasing device mounting and one said first interlock assembly interlock member body biasing device mounting, wherein each said first interlock assembly interlock biasing device biases said each first interlock assembly interlock member body to the latched, first position; and said carriage assembly first actuator body movable between a test position and a disconnect position.

7. The frame assembly secondary contact assembly of claim 6 wherein:

said slider assembly fixed to said frame assembly secondary contact assembly number of secondary contacts;

said slider assembly movably coupled to said circuit breaker housing assembly;

said slider assembly including a number of interlock member operators;

each interlock member operator structured to operatively engage a first interlock assembly interlock member body interlock member operator portion;

wherein, when said circuit breaker assembly is in said first position, each interlock member operator does not operatively engage a first interlock assembly interlock member interlock member body operator portion; and wherein, when said circuit breaker assembly is in said second position, each number of interlock member operator operatively engages a first interlock assembly interlock member interlock member body operator portion.

8. The frame assembly secondary contact assembly of claim 7 wherein:

said slider assembly includes a housing;

said slider assembly housing includes a drive cavity;

said second interlock assembly includes a number of interlock members, a number of biasing devices, and a number of elongated rails;

each second interlock assembly rail defining a multi-level path;

each second interlock assembly rail multi-level path including a number of release portions and a drive portion;

each second interlock assembly rail extending between, and coupled to, said carriage assembly front plate and said carriage assembly rear plate;

each said second interlock assembly interlock member including a body with a slot, a biasing device mounting, a rail follower, and a drive member;

wherein said second interlock assembly interlock member drive member is said carriage assembly second actuator;

each said second interlock assembly interlock member body movably coupled to said carriage assembly first actuator body and structured to move between a release, first position and a drive, second position;

each said second interlock assembly interlock member body rail follower movably coupled to an associated second interlock assembly rail;

each second interlock assembly interlock biasing device extending between, and coupled to both, one said carriage assembly first actuator body biasing device mounting and one said second interlock assembly interlock member body biasing device mounting, wherein each said second interlock assembly interlock biasing device biases said each second interlock assembly interlock member body to the drive, second position;

wherein, when said configurable electrical components are in one of said test configuration and said disconnect configuration, each said second interlock assembly interlock member body rail follower is disposed on one said second interlock assembly rail release portion wherein each said second interlock assembly interlock member drive member is spaced from said frame assembly secondary contact assembly housing, and, as said configurable electrical components are moving between said test configuration and said disconnect configuration, each said second interlock assembly interlock member body rail follower is disposed on said second interlock assembly rail drive portion, wherein said each said second interlock assembly interlock member drive member is disposed in said frame assembly secondary contact assembly housing drive cavity; and wherein said second interlock assembly rail drive portion operatively engages said frame assembly secondary contact assembly housing.

9. The frame assembly secondary contact assembly of claim 1 wherein:

said carriage assembly includes a sensor assembly, a front plate and a rear plate;

said sensor assembly including a number of sensors;

each said sensor structured to detect a proximate object;

said number of sensors include a disconnect limit switch and a test limit switch;

said disconnect limit switch coupled to said carriage assembly rear plate, wherein said disconnect limit switch is structured to detect a proximate object when said configurable electrical components are in said disconnect configuration; and said test limit switch coupled to said carriage assembly front plate, wherein said test limit switch is structured to detect a proximate object when said configurable electrical components are in said test configuration.

10. The frame assembly secondary contact assembly of claim 1 wherein said carriage assembly is an added assembly.

11. A circuit breaker installation comprising:

a frame assembly including a conductor assembly, said frame assembly defining an enclosed space;

said frame assembly enclosed space including a front side and a rear side;

said frame assembly conductor assembly including a primary contact assembly and a movable secondary contact assembly;
said frame assembly primary contact assembly including a number of primary contacts;
said frame assembly secondary contact assembly including a number of secondary contacts;
a circuit breaker assembly including a housing assembly and conductor assembly;
said circuit breaker assembly conductor assembly including a primary contact assembly and a secondary contact assembly;
said circuit breaker assembly primary contact assembly including a number of primary contacts;
said circuit breaker assembly secondary contact assembly including a number of secondary contacts;
wherein said frame assembly conductor assembly and said circuit breaker assembly conductor assembly are configurable electrical components;
said circuit breaker assembly movably disposed in said frame assembly enclosed space;
wherein said circuit breaker assembly moves between an inserted, first position and a withdrawn, second position;
wherein said frame assembly secondary contact assembly moves between an inserted, first position, a test, second position, and a disconnect, third position;
wherein said configurable electrical components move between a connect configuration, wherein said circuit breaker assembly primary contacts are coupled to, and in electrical communication with, said frame assembly primary contacts and said circuit breaker assembly secondary contacts are coupled to, and in electrical communication with, said frame assembly secondary contacts, a test configuration, wherein said circuit breaker assembly primary contacts are not coupled to, and are not in electrical communication with, said frame assembly secondary contacts and said circuit breaker assembly secondary contacts are coupled to, and in electrical communication with, said frame assembly secondary contacts, and, a disconnect configuration, wherein said circuit breaker assembly primary contacts are not coupled to, and are not in electrical communication with, said frame assembly primary contacts, and, said circuit breaker assembly secondary contacts are not coupled to, and are not in electrical communication with, said frame assembly secondary contacts; and
wherein, when said configurable electrical components are moved into said test configuration, said circuit breaker assembly remains in said second position, and, said frame assembly secondary contact assembly moves from one of said first position or said third position to said second position.

12. The circuit breaker installation of claim 11 wherein:
when said configurable electrical components are in said connect configuration, said frame assembly secondary contact assembly is adjacent to said frame assembly enclosed space rear side;
when said configurable electrical components are in said test configuration, said frame assembly secondary contact assembly is adjacent said frame assembly enclosed space front side; and
when said configurable electrical components are in said disconnect configuration, said frame assembly secondary contact assembly is between said first position and said second position.

13. The circuit breaker installation of claim 11 wherein:
when said configurable electrical components are in said connect configuration, said frame assembly secondary contact assembly is in said first position;
when said configurable electrical components are in said test configuration, said frame assembly secondary contact assembly is in said second position; and
when said configurable electrical components are in said disconnect configuration, said frame assembly secondary contact assembly is in said third position.

14. The circuit breaker installation of claim 13 wherein:
when said configurable electrical components are in said connect configuration, said circuit breaker assembly is in said first position;
when said configurable electrical components are in said test configuration, said circuit breaker assembly is in said second position; and
when said configurable electrical components are in said disconnect configuration, said circuit breaker assembly is in said second position.

15. The circuit breaker installation of claim 11 wherein:
said frame assembly includes a carriage assembly;
said carriage assembly including a first actuator and a second actuator;
said carriage assembly first actuator movable between a test position and a disconnect position;
said carriage assembly second actuator movable between a disengaged position and an engaged position;
said frame assembly and said circuit breaker assembly include a number of interlock assemblies;
said number of interlock assemblies includes a first interlock assembly and a second interlock assembly;
said first interlock assembly structured to maintain said carriage assembly first actuator in said test position when said configurable electrical components are in said connect configuration and to allow said carriage assembly first actuator to move between said test position and said disconnect position when said configurable electrical components are in one of, or in between, said test configuration or said disconnect configuration; and
said second interlock assembly structured to maintain said carriage assembly second actuator in said disengaged position when said configurable electrical components are in one of said test configuration and said disconnect configuration, and to allow said carriage assembly second actuator to move into said engaged position as said configurable electrical components are moving between said test configuration and said disconnect configuration.

16. The circuit breaker installation of claim 15 wherein:
said carriage assembly includes a front plate, a motor, a threaded rod, and a rear plate;
said carriage assembly front plate defining a number of latching surfaces;
said carriage assembly motor including a rotating output shaft;
said carriage assembly motor coupled to said carriage assembly rear plate;
said carriage assembly motor output shaft operatively coupled to said carriage assembly threaded rod;
said carriage assembly threaded rod extending between, and rotatably coupled to, said carriage assembly front plate and said carriage assembly rear plate;
carriage assembly first actuator including a body having a number of interlock member mountings and a number of biasing device mountings;

carriage assembly first actuator body defining a threaded passage;
said carriage assembly threaded rod operatively coupled to said carriage assembly first actuator body threaded passage;
said first interlock assembly including a number of interlock members and a number of biasing devices;
each first interlock assembly interlock member including a body having a slot, a biasing device mounting, a latching portion, and a number of interlock member operator portions;
each first interlock assembly interlock member body movably coupled to said carriage assembly first actuator body and structured to move between a latched, first position and an unlatched second position;
each first interlock assembly interlock biasing device extending between, and coupled to both, one said carriage assembly first actuator body biasing device mounting and one said first interlock assembly interlock member body biasing device mounting, wherein each said first interlock assembly interlock biasing device biases said each first interlock assembly interlock member body to the latched, first position; and
said carriage assembly first actuator body movable between a test position and said disconnect position.

17. The circuit breaker installation of claim 16 wherein:
said frame assembly secondary contact assembly includes a slider assembly;
said slider assembly fixed to said frame assembly secondary contact assembly number of secondary contacts;
said slider assembly movably coupled to said circuit breaker housing assembly;
said slider assembly including a number of interlock member operators;
each interlock member operator structured to operatively engage a first interlock assembly interlock member body interlock member operator portion;
wherein, when said circuit breaker assembly is in said first position, each number of interlock member operator does not operatively engage a first interlock assembly interlock member interlock member body operator portion; and
wherein, when said circuit breaker assembly is in said second position, each number of interlock member operator operatively engages a first interlock assembly interlock member interlock member body operator portion.

18. The circuit breaker installation of claim 17 wherein:
said slider assembly includes a housing;
said slider assembly housing includes a drive cavity;
said second interlock assembly includes a number of interlock members, a number of biasing devices, and a number of elongated rails;
each second interlock assembly rail defining a multi-level path;
each second interlock assembly rail multi-level path including a number of release portions and a drive portion;
each second interlock assembly rail extending between, and coupled to, said carriage assembly front plate and said carriage assembly rear plate;
each said second interlock assembly interlock member including a body with a slot, a biasing device mounting, a rail follower, and a drive member;
wherein said second interlock assembly interlock member drive member is said carriage assembly second actuator;
each said second interlock assembly interlock member body movably coupled to said carriage assembly first actuator body and structured to move between a release, first position and a drive, second position;
each said second interlock assembly interlock member body rail follower movably coupled to an associated second interlock assembly rail;
each second interlock assembly interlock biasing device extending between, and coupled to both, one said carriage assembly first actuator body biasing device mounting and one said second interlock assembly interlock member body biasing device mounting, wherein each said second interlock assembly interlock biasing device biases said each second interlock assembly interlock member body to the drive, second position;
wherein, when said configurable electrical components are in one of said test configuration and said disconnect configuration, each said second interlock assembly interlock member body rail follower is disposed on one said second interlock assembly rail release portion wherein each said second interlock assembly interlock member drive member is spaced from said frame assembly secondary contact assembly housing, and, as said configurable electrical components are moving between said test configuration and said disconnect configuration, each said second interlock assembly interlock member body rail follower is disposed on said second interlock assembly rail drive portion, wherein said each said second interlock assembly interlock member drive member is disposed in said frame assembly secondary contact assembly housing drive cavity; and
wherein said second interlock assembly rail drive portion operatively engages said frame assembly secondary contact assembly housing.

19. The circuit breaker installation of claim 11 wherein:
said carriage assembly includes a sensor assembly, a front plate and a rear plate;
said sensor assembly including a number of sensors;
each said sensor structured to detect a proximate object;
said number of sensors include a disconnect limit switch and a test limit switch;
said disconnect limit switch coupled to said carriage assembly rear plate, wherein said disconnect limit switch is structured to detect a proximate object when said configurable electrical components are in said disconnect configuration; and
said test limit switch coupled to said carriage assembly front plate, wherein said test limit switch is structured to detect a proximate object when said configurable electrical components are in said test configuration.

20. The circuit breaker installation of claim 11 wherein said carriage assembly is an added assembly.

21. A method of utilizing a circuit breaker installation including a number of configurable electrical components comprising:
providing a frame assembly including a conductor assembly, said frame assembly defining an enclosed space, said frame assembly enclosed space including a front side and a rear side, said frame assembly conductor assembly including a primary contact assembly and a movable secondary contact assembly, said frame assembly primary contact assembly including a number of primary contacts, said frame assembly secondary contact assembly including a number of secondary contacts;

providing a circuit breaker assembly including a housing assembly and conductor assembly, said circuit breaker assembly conductor assembly including a primary contact assembly and a secondary contact assembly, said circuit breaker assembly primary contact assembly including a number of primary contacts, said circuit breaker assembly secondary contact assembly including a number of secondary contacts, said circuit breaker further including a number of fixed contacts and a number of movable contacts, each movable contact movable between an open, first position, wherein each movable contact is not coupled to and is not in electrical communication with, an associated fixed contact, and a closed, second position, wherein each movable contact is coupled to and is in electrical communication with, an associated fixed contact;

wherein said frame assembly conductor assembly and said circuit breaker assembly conductor assembly are configurable electrical components;

wherein said circuit breaker assembly movably disposed in said frame assembly enclosed space;

wherein said circuit breaker assembly moves between an inserted, first position and a withdrawn, second position;

wherein said frame assembly secondary contact assembly moves between an inserted, first position, a test, second position, and a disconnect, third position;

wherein said configurable electrical components move between a connect configuration, wherein said circuit breaker assembly primary contacts are coupled to, and in electrical communication with, said frame assembly primary contacts and said circuit breaker assembly secondary contacts are coupled to, and in electrical communication with, said frame assembly secondary contacts, a test configuration, wherein said circuit breaker assembly primary contacts are not coupled to, and are not in electrical communication with, said frame assembly secondary contacts and said circuit breaker assembly secondary contacts are coupled to, and in electrical communication with, said frame assembly secondary contacts, and, a disconnect configuration, wherein said circuit breaker assembly primary contacts are not coupled to, and are not in electrical communication with, said frame assembly primary contacts, and, said circuit breaker assembly secondary contacts are not coupled to, and are not in electrical communication with, said frame assembly secondary contacts;

providing a control assembly structured to control said configurable electrical components; and utilizing said control assembly to configure said configurable electrical components in a selected configuration.

22. The method of claim 21 wherein providing a control assembly include providing a remote control assembly.

23. The method of claim 21 wherein utilizing said control assembly to configure said configurable electrical components in a selected configuration includes moving said configurable electrical components into said test configuration by moving said frame assembly secondary contact assembly from one of said first position or said third position to said second position while said circuit breaker assembly remains in said second position.

24. The method of claim 21 wherein utilizing said control assembly to configure said configurable electrical components in a selected configuration includes moving said frame assembly secondary contact assembly into said third position that is disposed between said first position and said second position.

25. The method of claim 21 wherein utilizing said control assembly to configure said configurable electrical components in a selected configuration includes moving the circuit breaker assembly movable contacts between the open, first position and the closed, second position.

* * * * *